US012506782B2

(12) United States Patent
Jeong et al.

(10) Patent No.: US 12,506,782 B2
(45) Date of Patent: Dec. 23, 2025

(54) SECURITY POLICY TRANSLATION IN INTERFACE TO NETWORK SECURITY FUNCTIONS

(71) Applicant: Research & Business Foundation SUNGKYUNKWAN UNIVERSITY, Suwon-si (KR)

(72) Inventors: Jaehoon Jeong, Busan (KR); Patrick Lingga, Suwon-si (KR); Jeonghyeon Kim, Hwaseong-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 261 days.

(21) Appl. No.: 18/089,308

(22) Filed: Dec. 27, 2022

(65) Prior Publication Data

US 2023/0353598 A1 Nov. 2, 2023

(30) Foreign Application Priority Data

Apr. 28, 2022 (KR) .................. 10-2022-0052893
Dec. 7, 2022 (KR) .................. 10-2022-0169739

(51) Int. Cl.
*H04L 9/40* (2022.01)
*H04L 41/0816* (2022.01)

(52) U.S. Cl.
CPC .......... *H04L 63/20* (2013.01); *H04L 41/0816* (2013.01)

(58) Field of Classification Search
CPC ..................... H04L 63/20; H04L 41/0816
See application file for complete search history.

(56) References Cited

U.S. PATENT DOCUMENTS

2020/0117720 A1* 4/2020 Yu ..................... G06F 16/24578
2021/0029175 A1* 1/2021 Jeong ................. H04L 41/0893

FOREIGN PATENT DOCUMENTS

KR 10-2020-0045400 A 5/2020
KR 10-2021-0012964 A 2/2021
KR 10-2021-0054439 A 5/2021

OTHER PUBLICATIONS

Jeong et al., "Guidelines for Security Policy Translation in Interface to Network Security Functions", I2NSF Working Group, Oct. 24, 2022.
Lingga, Patrick, et al. "Automatic Data Model Mapper for Security Policy Translation in Interface to Network Security Functions Framework." *2021 International Conference on Information and Communication Technology Convergence (ICTC)*. IEEE, Dec. 7, 2021. pp. 882-887.

(Continued)

*Primary Examiner* — Ayoub Alata
(74) *Attorney, Agent, or Firm* — NSIP Law

(57) ABSTRACT

Disclosed is a method in which a security controller translates a security policy for Interface to Network Security Functions (I2NSF), the method including: extracting data from a higher-level policy received from an I2NSF user; converting the extracted data into a capability of a target network security function (NSF) of the security policy by referring to mapping information between elements of a high-level data model and elements of a low-level data model; and generating a lower-level policy to execute the capability of the NSF.

18 Claims, 30 Drawing Sheets

(56) References Cited

OTHER PUBLICATIONS

Yang, Jinhyuk, et al. "An automata-based security policy translation for network security functions." *2018 International Conference on Information and Communication Technology Convergence (ICTC)*. IEEE, Nov. 18, 2018. pp. 1-5.

Korean Office Action issued on Aug. 8, 2024, in counterpart Korean Patent Application No. 10-2022-0169739 (5 pages in English, 5 pages in Korean).

\* cited by examiner

FIG. 2

```
Consumer-Facing Interface (CFI):
module: ietf-i2nsf-cfi-policy
  +--rw i2nsf-cfi-policy* [name]
     +--rw name                  string
     +--rw language?             string
     +--rw resolution-strategy?  identityref
     +--rw rules* [name]
     |  ...
     +--rw endpoint-groups
     |  ...
     +--rw threat-prevention
        ...

NSF-Facing Interface (NFI):
module: ietf-i2nsf-policy-rule-for-nsf
  +--rw i2nsf-security-policy* [name]
     +--rw name                  string
     +--rw language?             string
     +--rw priority-usage?       identityref
     +--rw resolution-strategy?  identityref
     +--rw default-action?       identityref
     +--rw rules* [name]
     |  ...
     +--rw rule-group
        ...
```

FIG. 3

```
Consumer-Facing Interface (CFI):
 +--rw rules* [name]
       |  +--rw name          string
       |  +--rw priority?     uint8
       |  +--rw event
       |  |   ...
       |  +--rw condition
       |  |   ...
       |  +--rw action
       |      ...

NSF-Facing Interface (NFI):
 +--rw rules* [name]
       |  +--rw name             string
       |  +--rw description?     string
       |  +--rw priority?        uint8
       |  +--rw enable?          boolean
       |  +--rw long-connection
       |  |   +--rw enable?      boolean
       |  |   +--rw duration?    uint32
       |  +--rw event
       |  |   ...
       |  +--rw condition
       |  |   ...
       |  +--rw action
       |      ...
```

FIG. 4

```
Consumer-Facing Interface (CFI):
|   +--rw event
|   |   +--rw system-event*    identityref
|   |   +--rw system-alarm*    identityref NSF-Facing Interface (NFI):
|   +--rw event
|   |   +--rw description?     string
|   |   +--rw system-event*    identityref
|   |   +--rw system-alarm*    identityref
```

FIG. 5a

```
Consumer-Facing Interface (CFI):
|   +--rw condition
|   |   +--rw firewall
|   |   |   +--rw source*                     union
|   |   |   +--rw destination*                union
|   |   |   +--rw transport-layer-protocol?   identityref
|   |   |   +--rw range-port-number
|   |   |   |   +--rw start-port-number?      inet:port-number
|   |   |   |   +--rw end-port-number?        inet:port-number
|   |   |   +--rw icmp
|   |   |      +--rw message*   identityref
|   |   +--rw ddos
|   |   |   +--rw rate-limit
|   |   |       +--rw packet-rate-threshold?   uint64
|   |   |       +--rw byte-rate-threshold?     uint64
|   |   |       +--rw flow-rate-threshold?     uint64
|   |   +--rw anti-virus
|   |   |   +--rw exception-files*   string
|   |   +--rw payload
|   |   |   +--rw content*
```

FIG. 5b

```
              -> /i2nsf-cfi-policy/threat-prevention/payload-content/name
|  |  +--rw url-category
|  |  |  +--rw url-name?
|  |  |        -> /i2nsf-cfi-policy/endpoint-groups/url-group/name
|  |  +--rw voice
|  |  |  +--rw source-id*       string
|  |  |  +--rw destination-id*  string
|  |  |  +--rw user-agent*      string
|  |  +--rw context
|  |  |  +--rw time
|  |  |  |  +--rw start-date-time?   yang:date-and-time
|  |  |  |  +--rw end-date-time?     yang:date-and-time
|  |  |  |  +--rw period
|  |  |  |  |  +--rw start-time?   time
|  |  |  |  |  +--rw end-time?     time
|  |  |  |  |  +--rw day*          day
|  |  |  |  |  +--rw date*         int32
|  |  |  |  |  +--rw month*        string
|  |  |  |  +--rw frequency?       enumeration
|  |  |  +--rw application
|  |  |  |  +--rw protocol*    identityref
|  |  |  +--rw device-type
|  |  |  |  +--rw device*      identityref
|  |  |  +--rw users
|  |  |  |  +--rw user* [id]
|  |  |  |  |  +--rw id      uint32
|  |  |  |  |  +--rw name?   string
|  |  |  |  +--rw group* [id]
|  |  |  |     +--rw id      uint32
|  |  |  |     +--rw name?   string
|  |  |  +--rw geographic-location
|  |  |     +--rw source*
|  |  |     |  -> /i2nsf-cfi-policy/endpoint-groups/location-group/name
|  |  |     +--rw destination*
|  |  |        -> /i2nsf-cfi-policy/endpoint-groups/location-group/name
|  |  +--rw threat-feed
|  |     +--rw name*
|  |        -> /i2nsf-cfi-policy/threat-prevention/threat-feed-list/name NSF-Facing Interface:
      |  +--rw condition
      |  |  +--rw description?   string
      |  |  +--rw layer-2* [destination-mac-address source-mac-address
      |  |              ethertype]
      |  |  |  +--rw description?                  string
      |  |  |  +--rw destination-mac-address       yang:mac-address
      |  |  |  +--rw destination-mac-address-mask? yang:mac-address
      |  |  |  +--rw source-mac-address            yang:mac-address
```

FIG. 5c

```
| | | +--rw source-mac-address-mask?        yang:mac-address
| | | +--rw ethertype                       eth:ethertype
| | +--rw (layer-3)?
| | | +--:(ipv4)
| | | | +--rw ipv4
| | | |    +--rw description?               string
| | | |    +--rw dscp?                      inet:dscp
| | | |    +--rw ecn?                       uint8
| | | |    +--rw length?                    uint16
| | | |    +--rw ttl?                       uint8
| | | |    +--rw protocol?                  uint8
| | | |    +--rw ihl?                       uint8
| | | |    +--rw flags?                     bits
| | | |    +--rw offset?                    uint16
| | | |    +--rw identification?            uint16
| | | |    +--rw (destination-network)?
| | | |    |  +--:(destination-ipv4-network)
| | | |    |  |  +--rw destination-ipv4-network?
| | | |    |  |                             inet:ipv4-prefix
| | | |    |  +--:(destination-ipv4-range)
| | | |    |     +--rw destination-ipv4-range* [start end]
| | | |    |        +--rw start   inet:ipv4-address-no-zone
| | | |    |        +--rw end     inet:ipv4-address-no-zone
| | | |    +--rw (source-network)?
| | | |       +--:(source-ipv4-network)
| | | |       |  +--rw source-ipv4-network? inet:ipv4-prefix
| | | |       +--:(source-ipv4-range)
| | | |          +--rw source-ipv4-range* [start end]
| | | |             +--rw start   inet:ipv4-address-no-zone
| | | |             +--rw end     inet:ipv4-address-no-zone
| | | +--:(ipv6)
| | |   +--rw ipv6
| | |      +--rw description?               string
| | |      +--rw dscp?                      inet:dscp
| | |      +--rw ecn?                       uint8
| | |      +--rw length?                    uint16
| | |      +--rw ttl?                       uint8
| | |      +--rw protocol?                  uint8
| | |      +--rw (destination-network)?
| | |      |  +--:(destination-ipv6-network)
| | |      |  |  +--rw destination-ipv6-network?
| | |      |  |                             inet:ipv6-prefix
| | |      |  +--:(destination-ipv6-range)
| | |      |     +--rw destination-ipv6-range* [start end]
| | |      |        +--rw start   inet:ipv6-address-no-zone
| | |      |        +--rw end     inet:ipv6-address-no-zone
| | |      +--rw (source-network)?
| | |         +--:(source-ipv6-network)
```

FIG. 5d

```
|   |   |   |   |   +--rw source-ipv6-network?  inet:ipv6-prefix
|   |   |   |   +--:(source-ipv6-range)
|   |   |   |      +--rw source-ipv6-range* [start end]
|   |   |   |         +--rw start   inet:ipv6-address-no-zone
|   |   |   |         +--rw end     inet:ipv6-address-no-zone
|   |   |   +--rw flow-label?       inet:ipv6-flow-label
|   |   +--rw (layer-4)?
|   |      +--:(tcp)
|   |      |  +--rw tcp
|   |      |     +--rw description?             string
|   |      |     +--rw source-port-number
|   |      |     |  +--rw (source-port)?
|   |      |     |     +--:(range-or-operator)
|   |      |     |     |  +--rw (port-range-or-operator)?
|   |      |     |     |     +--:(range)
|   |      |     |     |     |  +--rw lower-port  inet:port-number
|   |      |     |     |     |  +--rw upper-port  inet:port-number
|   |      |     |     |     +--:(operator)
|   |      |     |     |        +--rw operator?   operator
|   |      |     |     |        +--rw port        inet:port-number
|   |      |     |     +--:(port-list)
|   |      |     |        +--rw port-numbers* [start end]
|   |      |     |           +--rw start   inet:port-number
|   |      |     |           +--rw end     inet:port-number
|   |      |     +--rw destination-port-number
|   |      |     |  +--rw (destination-port)?
|   |      |     |     +--:(range-or-operator)
|   |      |     |     |  +--rw (port-range-or-operator)?
|   |      |     |     |     +--:(range)
|   |      |     |     |     |  +--rw lower-port  inet:port-number
|   |      |     |     |     |  +--rw upper-port  inet:port-number
|   |      |     |     |     +--:(operator)
|   |      |     |     |        +--rw operator?   operator
|   |      |     |     |        +--rw port        inet:port-number
|   |      |     |     +--:(port-list)
|   |      |     |        +--rw port-numbers* [start end]
|   |      |     |           +--rw start   inet:port-number
|   |      |     |           +--rw end     inet:port-number
|   |      |     +--rw sequence-number?         uint32
|   |      |     +--rw acknowledgement-number?  uint32
|   |      |     +--rw data-offset?             uint8
|   |      |     +--rw reserved?                uint8
|   |      |     +--rw flags?                   bits
|   |      |     +--rw window-size?             uint16
|   |      |     +--rw urgent-pointer?          uint16
|   |      |     +--rw options?                 binary
|   |      +--:(udp)
|   |         +--rw udp
```

FIG. 5e

```
|  |  |  |  |       +--rw description?              string
|  |  |  |  |       +--rw source-port-number
|  |  |  |  |       |  +--rw (source-port)?
|  |  |  |  |       |     +--:(range-or-operator)
|  |  |  |  |       |     |  +--rw (port-range-or-operator)?
|  |  |  |  |       |     |     +--:(range)
|  |  |  |  |       |     |     |  +--rw lower-port   inet:port-number
|  |  |  |  |       |     |     |  +--rw upper-port   inet:port-number
|  |  |  |  |       |     |     +--:(operator)
|  |  |  |  |       |     |        +--rw operator?    operator
|  |  |  |  |       |     |        +--rw port         inet:port-number
|  |  |  |  |       |     +--:(port-list)
|  |  |  |  |       |        +--rw port-numbers* [start end]
|  |  |  |  |       |           +--rw start    inet:port-number
|  |  |  |  |       |           +--rw end      inet:port-number
|  |  |  |  |       +--rw destination-port-number
|  |  |  |  |       |  +--rw (destination-port)?
|  |  |  |  |       |     +--:(range-or-operator)
|  |  |  |  |       |     |  +--rw (port-range-or-operator)?
|  |  |  |  |       |     |     +--:(range)
|  |  |  |  |       |     |     |  +--rw lower-port   inet:port-number
|  |  |  |  |       |     |     |  +--rw upper-port   inet:port-number
|  |  |  |  |       |     |     +--:(operator)
|  |  |  |  |       |     |        +--rw operator?    operator
|  |  |  |  |       |     |        +--rw port         inet:port-number
|  |  |  |  |       |     +--:(port-list)
|  |  |  |  |       |        +--rw port-numbers* [start end]
|  |  |  |  |       |           +--rw start    inet:port-number
|  |  |  |  |       |           +--rw end      inet:port-number
|  |  |  |  |       +--rw length?                   uint16
|  |  |  |  +--:(sctp)
|  |  |  |     +--rw sctp
|  |  |  |        +--rw description?              string
|  |  |  |        +--rw source-port-number
|  |  |  |        |  +--rw (source-port)?
|  |  |  |        |     +--:(range-or-operator)
|  |  |  |        |     |  +--rw (port-range-or-operator)?
|  |  |  |        |     |     +--:(range)
|  |  |  |        |     |     |  +--rw lower-port   inet:port-number
|  |  |  |        |     |     |  +--rw upper-port   inet:port-number
|  |  |  |        |     |     +--:(operator)
|  |  |  |        |     |        +--rw operator?    operator
|  |  |  |        |     |        +--rw port         inet:port-number
|  |  |  |        |     +--:(port-list)
|  |  |  |        |        +--rw port-numbers* [start end]
|  |  |  |        |           +--rw start    inet:port-number
|  |  |  |        |           +--rw end      inet:port-number
|  |  |  |        +--rw destination-port-number
```

FIG. 5f

```
|  |  |  |  |     +--rw (destination-port)?
|  |  |  |  |        +--:(range-or-operator)
|  |  |  |  |        |  +--rw (port-range-or-operator)?
|  |  |  |  |        |     +--:(range)
|  |  |  |  |        |     |  +--rw lower-port   inet:port-number
|  |  |  |  |        |     |  +--rw upper-port   inet:port-number
|  |  |  |  |        |     +--:(operator)
|  |  |  |  |        |        +--rw operator?    operator
|  |  |  |  |        |        +--rw port         inet:port-number
|  |  |  |  |        +--:(port-list)
|  |  |  |  |           +--rw port-numbers* [start end]
|  |  |  |  |              +--rw start    inet:port-number
|  |  |  |  |              +--rw end      inet:port-number
|  |  |  |  +--rw chunk-type*              uint8
|  |  |  |  +--rw chunk-length?            uint16
|  |  |  +--:(dccp)
|  |  |  |  +--rw dccp
|  |  |  |     +--rw description?              string
|  |  |  |     +--rw source-port-number
|  |  |  |     |  +--rw (source-port)?
|  |  |  |     |     +--:(range-or-operator)
|  |  |  |     |     |  +--rw (port-range-or-operator)?
|  |  |  |     |     |     +--:(range)
|  |  |  |     |     |     |  +--rw lower-port   inet:port-number
|  |  |  |     |     |     |  +--rw upper-port   inet:port-number
|  |  |  |     |     |     +--:(operator)
|  |  |  |     |     |        +--rw operator?    operator
|  |  |  |     |     |        +--rw port         inet:port-number
|  |  |  |     |     +--:(port-list)
|  |  |  |     |        +--rw port-numbers* [start end]
|  |  |  |     |           +--rw start    inet:port-number
|  |  |  |     |           +--rw end      inet:port-number
|  |  |  |     +--rw destination-port-number
|  |  |  |     |  +--rw (destination-port)?
|  |  |  |     |     +--:(range-or-operator)
|  |  |  |     |     |  +--rw (port-range-or-operator)?
|  |  |  |     |     |     +--:(range)
|  |  |  |     |     |     |  +--rw lower-port   inet:port-number
|  |  |  |     |     |     |  +--rw upper-port   inet:port-number
|  |  |  |     |     |     +--:(operator)
|  |  |  |     |     |        +--rw operator?    operator
|  |  |  |     |     |        +--rw port         inet:port-number
|  |  |  |     |     +--:(port-list)
|  |  |  |     |        +--rw port-numbers* [start end]
|  |  |  |     |           +--rw start    inet:port-number
|  |  |  |     |           +--rw end      inet:port-number
|  |  |  |     +--rw service-code*             uint32
|  |  |  |     +--rw type*                     uint8
```

FIG. 5g

```
|  |  |        +--rw data-offset?                  uint8
|  |  +--:(icmp)
|  |     +--rw icmp
|  |        +--rw description?       string
|  |        +--rw version?           enumeration
|  |        +--rw type?              uint8
|  |        +--rw code?              uint8
|  |        +--rw rest-of-header?    binary
|  +--rw url-category
|  |  +--rw description?      string
|  |  +--rw pre-defined*      string
|  |  +--rw user-defined*     string
|  +--rw voice
|  |  +--rw description?           string
|  |  +--rw source-voice-id*       string
|  |  +--rw destination-voice-id*  string
|  |  +--rw user-agent*            string
|  +--rw ddos
|  |  +--rw description?       string
|  |  +--rw alert-packet-rate? uint32
|  |  +--rw alert-flow-rate?   uint32
|  |  +--rw alert-byte-rate?   uint32
|  +--rw anti-virus
|  |  +--rw profile*          string
|  |  +--rw exception-files*  string
|  +--rw payload
|  |  +--rw description?  string
|  |  +--rw content*      binary
|  +--rw context
|     +--rw description?              string
|     +--rw time
|     |  +--rw start-date-time?   yang:date-and-time
|     |  +--rw end-date-time?     yang:date-and-time
|     |  +--rw period
|     |  |  +--rw start-time?  time
|     |  |  +--rw end-time?    time
|     |  |  +--rw day*         day
|     |  |  +--rw date*        int8
|     |  |  +--rw month*       string
|     |  +--rw frequency?         enumeration
|     +--rw application
|     |  +--rw description?  string
|     |  +--rw protocol*     identityref
|     +--rw device-type
|     |  +--rw description?  string
|     |  +--rw device*       identityref
|     +--rw users
|        +--rw description?  string
```

FIG. 5h

```
|  |  | +--rw user* [id]
|  |  | | +--rw id      uint32
|  |  | | +--rw name?   string
|  |  | +--rw group* [id]
|  |  |   +--rw id      uint32
|  |  |   +--rw name?   string
|  |  +--rw geographic-location
|  |     +--rw description?   string
|  |     +--rw source*        string
|  |     +--rw destination*   string
```

FIG. 6

```
Consumer-Facing Interface (CFI):
    +--rw action
    |   +--rw primary-action
    |   |   +--rw action?   identityref
    |   +--rw secondary-action
    |       +--rw log-action?   identityref NSF-Facing Interface (NFI):
|   +--rw action
|       +--rw description?        string
|       +--rw packet-action
|       |   +--rw ingress-action?    identityref
|       |   +--rw egress-action?     identityref
|       |   +--rw log-action?        identityref
|       +--rw flow-action
|       |   +--rw ingress-action?    identityref
|       |   +--rw egress-action?     identityref
|       |   +--rw log-action?        identityref
|       +--rw advanced-action
|           +--rw content-security-control*    identityref
|           +--rw attack-mitigation-control*   identityref
```

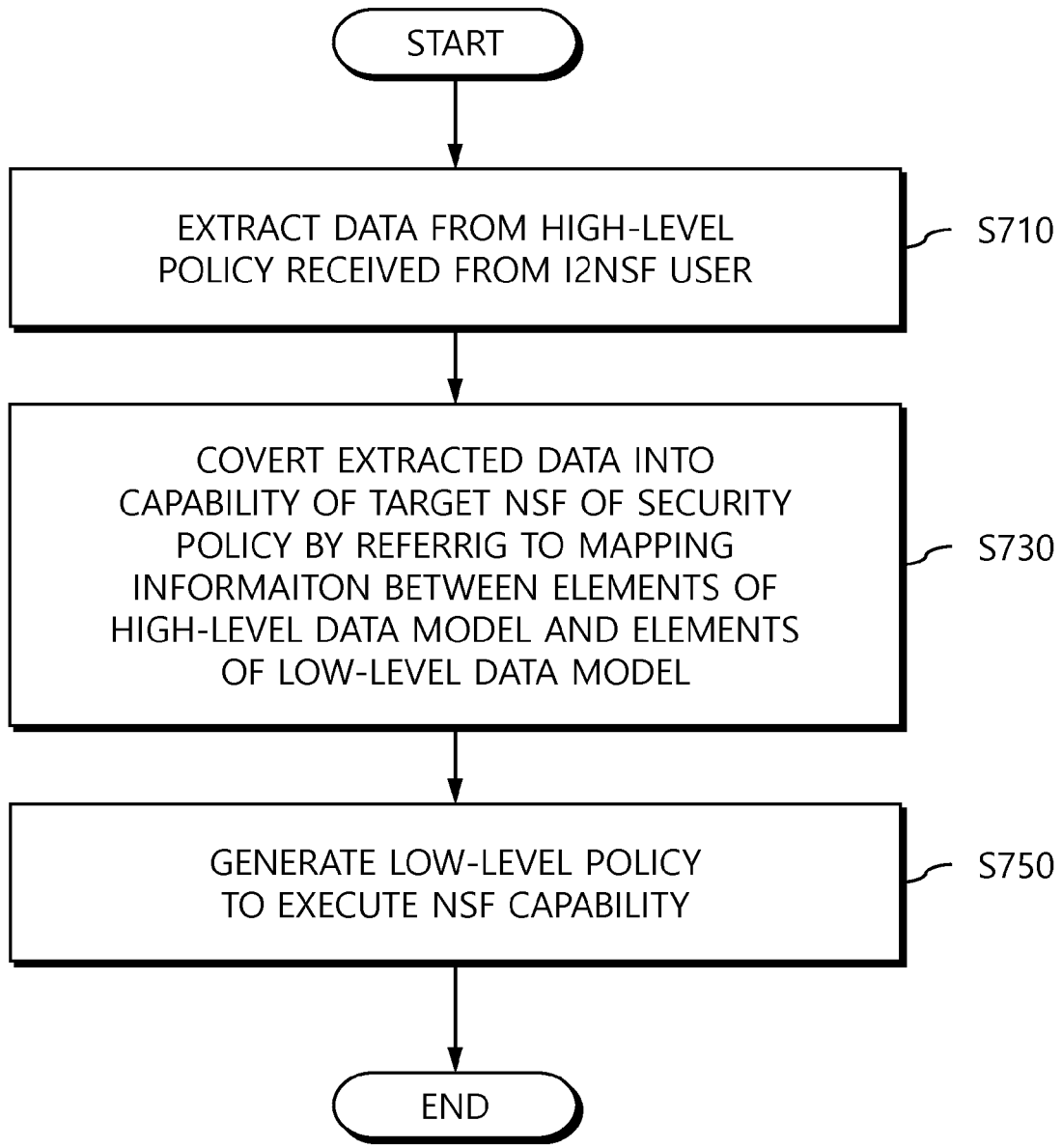

FIG. 10

```xml
<i2nsf-cfi-policy
  xmlns="urn:ietf:params:xml:ns:yang:ietf-i2nsf-cfi-policy">
  <name>block_web_security_policy</name>
  <rules>
    <name>block_web</name>
    <condition>
      <firewall-condition>
        <source>Son's_PC</source>
      <firewall-condition>
      <url-condition>
        <url-name>malicious_websites</url-name>
      </url-condition>
    </condition>
    <actions>
      <primary-action>
        <action>drop</action>
      </primary-action>
    </actions>
  </rules>
</i2nsf-cfi-policy>
```

FIG. 16

| Algorithm 1 Automatic Data Model Mapper Algorithm |
| --- |
| 1: Inputs: High-Level Data Model ($H$), Low-Level Data Model ($L$) |
| 2: Tree($H$), Tree($L$) // Create a high-level tree graph H and a low-level tree graph L |
| 3: $current \leftarrow H[0]$ |
| 4: for $i = 1$ to $L.length$ do |
| 5:    $treeDist[L[i]] \leftarrow ZSS(current, L[i]))$ // Calculate Tree Edit Distance |
| 6: end for |
| 7: $map[current] \leftarrow$ Keys of $min(treeDist)$ |
| 8: for $i = 1$ to $H.length$ do |
| 9:    $current \leftarrow H[i]$ |
| 10:   $pair \leftarrow map[current.parent].childs$ |
| 11:   for $j = 0$ to $pair.length$ do |
| 12:      $treeDist[pair[j]] \leftarrow ZSS(current, pair[j])$ |
| 13:   end for |
| 14:   $map[current] \leftarrow$ Keys of $min(treeDist)$ // The mapping uses the minimum value of Tree Edit Distances |
| 15: end for |
| 16: return $map$ |

FIG. 17a

```
#policy name mapping
/consumer-facing/i2nsf-cfi-policy/name
    -> mapping: /nsf-facing/i2nsf-security-policy
                /name rule name mapping
/consumer-facing/i2nsf-cfi-policy/rules/name
    -> mapping: /nsf-facing/i2nsf-security-policy
                /rules/name time mapping
/consumer-facing/i2nsf-cfi-policy/
/rules/event/time/start-date-time
    -> mapping: /nsf-facing/i2nsf-security-policy
                /rules/event/time/start-date-time /consumer-facing/i2nsf-cfi-policy/
/rules/event/time/end-date-time
    -> mapping: /nsf-facing/i2nsf-security-policy
                /rules/event/time/end-date-time /consumer-facing/i2nsf-cfi-policy/
/rules/event/time/period/day
    -> mapping: /nsf-facing/i2nsf-security-policy
                /rules/event/time/period/day /consumer-facing/i2nsf-cfi-policy/
/rules/event/time/period/date
    -> mapping: /nsf-facing/i2nsf-security-policy
                /rules/event/time/period/date /consumer-facing/i2nsf-cfi-policy/
/rules/event/time/period/month
    -> mapping: /nsf-facing/i2nsf-security-policy
                /rules/event/time/period/month /consumer-facing/i2nsf-cfi-policy/
/rules/event/time/frequency
    -> mapping: /nsf-facing/i2nsf-security-policy
                /rules/event/time/frequency
```

FIG. 17b

```
#firewall-condition source target reference and mapping
/consumer-facing/i2nsf-cfi-policy/rules/condition
/firewall-condition/source
    -> reference: /consumer-facing/policy
                  /endpoint-group/user-group/name
    -> reference: /consumer-facing/policy
                  /endpoint-group/device-group/name
        -> extract: /consumer-facing/policy
                    /endpoint-group/user-group/mac-address
            -> mapping: /nsf-facing/i2nsf-security-policy
                        /rules/condition/ethernet
                        /source-mac-address
        -> extract: /consumer-facing/policy
                    /endpoint-group/user-group/ip-address
            -> mapping: /nsf-facing/i2nsf-security-policy
                        /rules/condition/ipv4
                        /source-ipv4-network
            -> mapping: /nsf-facing/i2nsf-security-policy
                        /rules/condition/ipv4
                        /source-ipv4-range
            -> mapping: /nsf-facing/i2nsf-security-policy
                        /rules/condition/ipv6
                        /source-ipv6-network
            -> mapping: /nsf-facing/i2nsf-security-policy
                        /rules/condition/ipv6
                        /source-ipv6-range firewall-condition destination target reference and mapping
/consumer-facing/i2nsf-cfi-policy/rule/condition
/firewall-condition/destination
    -> reference: /consumer-facing/policy
                  /endpoint-group/user-group/name
    -> reference: /consumer-facing/policy
                  /endpoint-group/device-group/name
        -> extract: /consumer-facing/policy
                    /endpoint-group/user-group/mac-address
            -> mapping: /nsf-facing/i2nsf-security-policy
                        /rules/condition/ethernet
                        /destination-mac-address
        -> extract: /consumer-facing/policy
                    /endpoint-group/user-group/ip-address
            -> mapping: /nsf-facing/i2nsf-security-policy
                        /rules/condition/ipv4
                        /destination-ipv4-network
            -> mapping: /nsf-facing/i2nsf-security-policy
                        /rules/condition/ipv4
                        /destination-ipv4-range
            -> mapping: /nsf-facing/i2nsf-security-policy
```

FIG. 17c

```
                    /rules/condition/ipv6
                    /destination-ipv6-network
        -> mapping: /nsf-facing/i2nsf-security-policy
                    /rules/condition/ipv6
                    /destination-ipv6-range ddos-condition threshold mapping
/consumer-facing/i2nsf-cfi-policy/rules/condition
/ddos-condition/packet-rate-threshold
    -> mapping: /nsf-facing/i2nsf-security-policy/rules/condition
                /ddos/alert-packet-rate /consumer-facing/i2nsf-cfi-policy/rules/condition
/ddos-condition/packet-byte-threshold
    -> mapping: /nsf-facing/i2nsf-security-policy/rules/condition
                /ddos/alert-byte-rate /consumer-facing/i2nsf-cfi-policy/rules/condition
/ddos-condition/flow-rate-threshold
    -> mapping: /nsf-facing/i2nsf-security-policy/rules/condition
                /ddos/alert-flow-rate payload-condition mapping
/consumer-facing/i2nsf-cfi-policy/rules/condition
/payload-condition/content
    -> reference: /consumer-facing/i2nsf-cfi-policy
                  /threat-prevention/payload-content/name
        -> extract: /consumer-facing/i2nsf-cfi-policy
                    /threat-prevention/payload-content/content
            -> mapping: /nsf-facing/i2nsf-security-policy
                        /rules/condition/payload/content voice-condition mapping
/consumer-facing/i2nsf-cfi-policy/rules/condition
/voice-condition/source-id
    -> mapping: /nsf-facing/i2nsf-security-policy
                /rules/condition/voice
                /source-voice-id /consumer-facing/i2nsf-cfi-policy/rules/condition
/voice-condition/destination-id
    -> mapping: /nsf-facing/i2nsf-security-policy
                /rules/condition/voice
                /destination-voice-id /consumer-facing/i2nsf-cfi-policy/rules/condition
/voice-condition/user-agent
    -> mapping: /nsf-facing/i2nsf-security-policy
```

FIG. 17d

```
                /rules/condition/voice
                /user-agent geographic-location mapping
/consumer-facing/i2nsf-cfi-policy/rules/condition/context
/geographic-location/source
    -> reference: /consumer-facing/i2nsf-cfi-policy
                  /endpoint-groups/location-group/name
        -> extract: /consumer-facing/i2nsf-cfi-policy
                    /endpoint-groups/location-group
                    /geo-ip-ipv4/ipv4-address
            -> mapping: /nsf-facing/i2nsf-security-policy
                        /rules/condition/ipv4
                        /source-ipv4-network
            -> mapping: /nsf-facing/i2nsf-security-policy
                        /rules/condition/ipv4
                        /source-ipv4-range
        -> extract: /consumer-facing/i2nsf-cfi-policy
                    /endpoint-groups/location-group
                    /continent
            -> mapping: /nsf-facing/i2nsf-security-policy
                        /rules/condition/context
                        /geographic-location/source /consumer-facing/i2nsf-cfi-policy/rules/condition/context
/geographic-location/destination
    -> reference: /consumer-facing/i2nsf-cfi-policy
                  /endpoint-groups/location-group/name
        -> extract: /consumer-facing/i2nsf-cfi-policy
                    /endpoint-groups/location-group
                    /geo-ip-ipv4/ipv4-address
            -> mapping: /nsf-facing/i2nsf-security-policy
                        /rules/condition/ipv4
                        /destination-ipv4-network
            -> mapping: /nsf-facing/i2nsf-security-policy
                        /rules/condition/ipv4
                        /destination-ipv4-range
        -> extract: /consumer-facing/i2nsf-cfi-policy
                    /endpoint-groups/location-group
                    /continent
            -> mapping: /nsf-facing/i2nsf-security-policy
                        /rules/condition/context
                        /geographic-location/destination url-condition mapping
/consumer-facing/i2nsf-cfi-policy/rules/condition
/url-condition/url-name
    -> reference: /consumer-facing/i2nsf-cfi-policy
```

FIG. 17e

```
              /endpoint-groups/url-group/name
    -> extract: /consumer-facing/i2nsf-cfi-policy
              /endpoint-groups/url-group/url
       -> mapping: /nsf-facing/i2nsf-security-policy
                   /rules/condition/url-category
                   /pre-defined
       -> mapping: /nsf-facing/i2nsf-security-policy
                   /rules/condition/url-category
                   /user-defined rule action name mapping
/consumer-facing/i2nsf-cfi-policy/rules/actions/primary-action
    -> mapping: /nsf-facing/i2nsf-security-policy
                /rules/action
                /packet-action/ingress-action
    -> mapping: /nsf-facing/i2nsf-security-policy
                /rules/action
                /packet-action/egress-action
    -> mapping: /nsf-facing/i2nsf-security-policy
                /rules/action
                /advanced-action/content-security-control
    -> mapping: /nsf-facing/i2nsf-security-policy
                /rules/action
                /advanced-action/attack-mitigation-control /consumer-facing/i2nsf-cfi-policy/rules/actions/secondary-action
    -> mapping: /nsf-facing/i2nsf-security-policy
                /rules/action/packet-action/log-action
```

FIG. 19

Algorithm 2 Policy Provisioning Algorithm

1: function POLICY_PROVISIONING(*convertedData*) ▷ *convertedData* contains the results of the conversion
2:   $U \leftarrow$ FIND_UNIVERSE(*convertedData*) ▷ $U$ is the Universe, which contains the capabilities required
3:   $S \leftarrow$ FIND_SUBSETS($U$) ▷ $S$ is the set of all NSFs that have at least one capability that covers $U$
4:   $nsf \leftarrow$ FIND_NSFs($U, S$)
5:   $Results \leftarrow \emptyset$
6:   for *key, val* in *convertedData* do
7:     for $i$ in $len(nsf)$ do
8:       if $nsf[i]$ has the capability for *key* then
9:         if ("*action*" in *key*) and ($i < len(nsf) - 1$) then
10:           $Result[n][key] \leftarrow nsf[i+1]$
11:         else
12:           $Result[n][key] \leftarrow val$
13:         end if
14:       end if
15:     end for
16:   end for
17:   return *Results*
18: end function

FIG. 21

```xml
<i2nsf-security-policy>
  <name>block_web_security_policy</name>
  <rules>
    <name>block_web</name>
    <condition>
      <ipv4>
        <ipv4>
          <source-ipv4-network>192.0.2.0/24</source-ipv4-network>
        </ipv4>
      </ipv4>
      <url-category>
        <user-defined>malicious1</user-defined>
        <user-defined>malicious2</user-defined>
      </url-category>
    </condition>
    <action>
      <packet-action>drop</packet-action>
    </action>
  </rules>
</i2nsf-security-policy>
```

SECURITY POLICY TRANSLATION IN INTERFACE TO NETWORK SECURITY FUNCTIONS

CROSS-REFERENCE TO RELATED APPLICATIONS

This application claims the benefit under 35 USC § 119(a) of Korean Patent Application No. 10-2022-0052893, filed on Apr. 28, 2022, in the Korean Intellectual Property Office, and Korean Patent Application No. 10-2022-0169739 filed on Dec. 7, 2022 in the Korean Intellectual Property Office, the entire disclosures of which are incorporated herein by reference for all purposes.

BACKGROUND

1. Field

The present disclosure relates to a technology for translating a security policy and is to explain a method and apparatus in which, when an Interface to Network Security Functions (I2NSF) user transmits a high-level security policy for a security service, a security policy translator of a security controller translates the high-level security policy into a low-level security policy to Network Security Functions (NSFs).

2. Related Art

Information can be quickly accessed regardless of geographical distance by connecting the network to the world. The Internet is essentially a large number of networks in which different levels of hierarchical structures are connected to each other.

The Internet is operated based on transport control protocol (TCP)/internet protocol (IP) published by the Internet Engineering Task Force (IETF), and the TCP/IP can be found in RFC 791 issued by the Request For Comments (RFC) 703 and the IETF.

SUMMARY

The technical objects to be achieved by the embodiments of the present disclosure is to solve the inconvenience for a security administrator to directly write and set security policies in corresponding network security functions in a high-level language to reflect the user's intention in a traditional network, and to overcome the limitation that security administrator has to have prior knowledge of various network security functions and invest time and effort to translate high-level policies into low-level policies due to this inconvenience.

The technical objects to be achieved by the present disclosure are not limited to those that have been described hereinabove merely by way of example, and other technical objects that are not mentioned can be clearly understood by those skilled in the art, to which the present disclosure pertains, from the following descriptions.

In order to solve the above technical objects, there is provided a method in which a security controller translates a security policy for Interface to Network Security Functions (I2NSF), the method including: extracting data from a higher-level policy received from an I2NSF user; converting the extracted data into a capability of a target network security function (NSF) of the security policy by referring to mapping information between elements of a high-level data model and elements of a low-level data model; and generating a lower-level policy to execute the capability of the NSF.

In the policy translation method according to an embodiment, in the extracting of the data, data may be extracted from the higher-level policy through state transition using a Deterministic Finite Automaton (DFA).

In the policy translation method according to an embodiment, the converting into the capability of the target NSF may include: selecting a target NSF for providing a security service by using the extracted data; and converting the extracted data into a capability of the selected target NSF. In addition, in the selecting of the target NSF, the extracted data may be compared with information about capabilities of NSFs possessed by the security controller to search for a target NSF only with higher-level policy data.

In the policy translation method according to an embodiment, in the converting into the capability of the target NSF, high-level policy data may be converted into low-level policy data compatible with the target NSF by referring to an NSF database comprising endpoint information and NSF capability information. In addition, the endpoint information may be received as a higher-level policy from an I2NSF user to apply a security policy, the NSF capability information may be received from a Developer's Management System (DMS) to indicate features supported by NSFs, and the NSF database may be constructed based on the received endpoint information and the NSF capability information.

In the policy translation method according to an embodiment, in the mapping information, a high-level data model and a low-level data model may be respectively converted into tree graphs, a tree edit distance between respective elements of the converted tree graphs may be calculated, and similar elements between the data models may be stored as mapping candidates by using calculated minimum distances. In addition, the tree editing distance may be calculated using at least one metric of Levenshtein distance, cosine similarity, and sequence matching.

In the policy translation method according to an embodiment, in the generating of the lower-level policy, low-level data and low-level attributes may be combined in pairs to generate a low-level policy in an Extensible Markup Language (XML) or JavaScript Object Notation (JSON) form for the target NSF.

In the policy translation method according to an embodiment, the security controller may be connected to the I2NSF user through a Consumer-Facing Interface (CFI) to receive the higher-level policy, and transmit the lower-level policy through an NSF-Facing Interface (NFI) to the target NSF for executing a rule corresponding to the lower-level policy.

In order to achieve the above technical objects, there is provided an apparatus for translating a security policy for Interface to Network Security Functions (I2NSF), the apparatus comprising: a data extractor configured to extract data from a higher-level policy received from an I2NSF user; a data converter configured to convert the extracted data into a capability of a target Network Security Function (NSF) of a security policy by referring to mapping information between elements of a high-level data model and elements of a low-level data model; and a policy generator configured to generate a low-level policy to execute the capability of the NSF.

In the policy translation apparatus according to another embodiment, the data extractor may be further configured to extract data through state transition from the higher-level policy using Deterministic Finite Automaton (DFA).

In the policy translation apparatus according to another embodiment, wherein the data converter may be further configured to select a target NSF for providing a security service by using the extracted data; and convert the extracted data into a capability of the selected target NSF. In addition, the data converter may be further configured to compare the extracted data with information on capabilities of NSFs possessed by the security controller to search for a target NSF only with higher-level policy data.

In the policy translation apparatus according to another embodiment, the data converter may be further configured to convert high-level policy data into low-level policy data compatible with the target NSF by referring to an NSF database containing endpoint information and NSF capability information. In addition, the endpoint information may be received as a higher-level policy from an I2NSF user to apply a security policy, the NSF capability information may be received from a Developer's Management System (DMS) to indicate features supported by NSFs, and the NSF database may be constructed based on the received endpoint information and the NSF capability information.

In the policy translation apparatus according to another embodiment, in the mapping information, a high-level data model and a low-level data model may be respectively converted into tree graphs by data model mapper, a tree edit distance between respective elements of the converted tree graphs may be calculated, and similar elements between the data models may be stored as mapping candidates by using calculated minimum distances. In addition, the tree editing distance may be calculated using at least one metric of Levenshtein distance, cosine similarity, and sequence matching.

In the policy translator according to another embodiment, the policy generator may be further configured to combine low-level data and low-level attributes in pairs to generate a low-level policy in an Extensible Markup Language (XML) or JavaScript Object Notation (JSON) form for the target NSF.

In the policy translator according to another embodiment, the security controller may be connected to the I2NSF user through a Consumer-Facing Interface (CFI) to receive the higher-level policy, and transmit the lower-level policy through an NSF-Facing Interface (NFI) to the target NSF for executing a rule corresponding to the lower-level policy.

In the embodiments of the present disclosure, when an I2NSF user transmits a high-level security policy for security services, the high-level security policy is quickly and easily converted into a low-level security policy for network security functions (NSFs) and a relationship between the high-level security policy based on the consumer-facing interface YANG data model and the low-level security policy based on the NSF-facing interface YANG data model is specified, and thus, it is possible to automatically set security issues related to complex network security functions only through the specification of network security services and to easily operate the security services in a wireless network environment without professional prior knowledge.

Effects that could be achieved with the present disclosure are not limited to those that have been described hereinabove merely by way of example, and other effects and advantages of the present disclosure will be more clearly understood from the following description by a person skilled in the art to which the present disclosure pertains.

BRIEF DESCRIPTION OF THE DRAWINGS

The accompanying drawings, which are included to provide a further understanding of the present disclosure and constitute a part of the detailed description, illustrate embodiments of the present disclosure and serve to explain technical features of the present disclosure together with the description.

FIG. 2 is a diagram showing a comparison in the top-level of the Consumer-Facing Interface (CFI) and NSF-Facing Interface (NFI) YANG Trees.

FIG. 3 is a diagram showing comparison between CFI and NFI Rule-Level YANG trees.

FIG. 4 is a diagram showing comparison between CFI and NFI Event YANG trees.

FIGS. 5A to 5H are diagrams illustrating comparison between CFI and NFI Condition YANG trees.

FIG. 6 is a diagram showing comparison between CFI and NFI Action YANG trees.

FIG. 7 is a flowchart illustrating a method for a security controller to translate a security policy for Interface to Network Security Functions (I2NSFs) according to an embodiment of the present disclosure.

FIG. 10 is a diagram illustrating a high-level policy.

FIG. 16 is pseudocode illustrating an algorithm of the automatic data model mapper of FIG. 14.

FIGS. 17a to 17e illustrate mapping information for data conversion between a CFI YANG data model and an NFI YANG data model.

FIG. 19 is a pseudocode illustrating an algorithm for policy provisioning to select appropriate NSFs for a given security policy.

FIG. 21 is a diagram illustrating a low-level policy.

DESCRIPTION OF EXEMPLARY EMBODIMENTS

Reference will now be made in detail to embodiments of the disclosure, examples of which are illustrated in the accompanying drawings. It will be noted that a detailed description of known arts will be omitted if it is determined that the detailed description of the known arts can obscure embodiments of the present disclosure. In addition, throughout the present disclosure, 'including' or 'comprising' any component does not exclude other components unless otherwise stated, but means that other components may be further included.

The terms used in the present disclosure are only used to describe specific embodiments or examples, and are not intended to limit the present disclosure. A singular expression can include a plural expression as long as it does not have an apparently different meaning in context. In the present disclosure, the terms "include" and "have" should be understood to be intended to designate that features, numbers, steps, operations, components, parts or combinations thereof exist and not to preclude the presence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary skill in the art to which the present disclosure pertains. The terms defined in a generally used dictionary can be understood to have meanings identical to those used in the context of a related art, and are not to be construed to have ideal or excessively formal meanings unless they are obviously specified in the present disclosure.

Recently, a fundamental standard interface for an Network Function Virtualization (NFV)-based security function has been developed by an Interface to Network Security Functions (I2NSF) working group. This is a part of the international internet standard organization called the Internet Engineering Task Force (IETF).

The object of the I2NSF is to define a standardized interface for heterogeneous network security function(s) (NSF) provided by multiple security solution vendors.

In an I2NSF architecture, without considering in detail the management of NSF(s) (the management of NSF eventually requires enforcement of a security policy), a user can define a protection policy for protecting network resources in a network system of the user. Further, a standardized interface to NSF(s) from multiple vendors can simplify configuration and managing of tasks for heterogeneous NSF(s).

Figure 1:
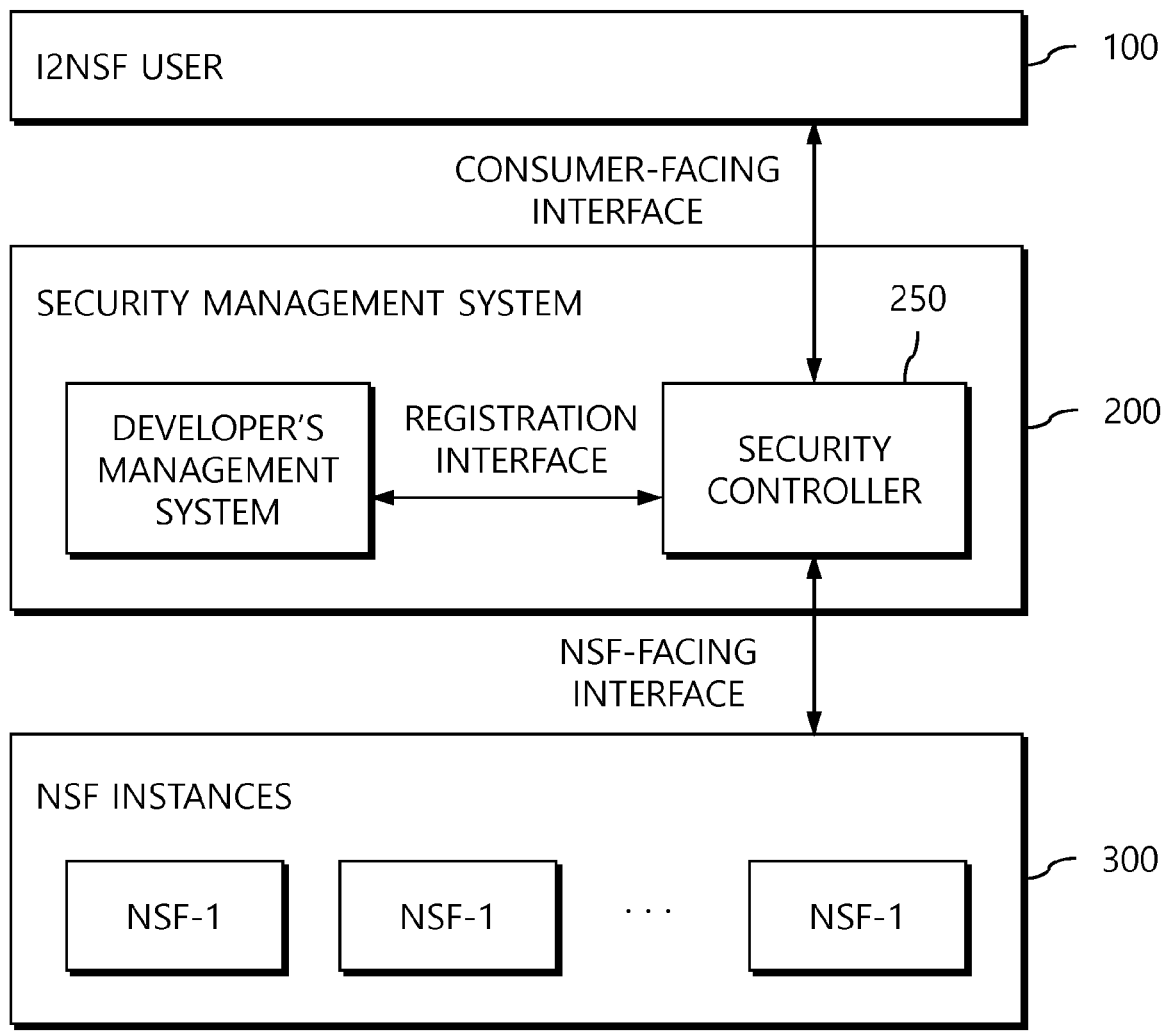
FIG. 1 illustrates an Interface to Network Security Functions (I2NSF) framework to which embodiments of the present disclosure is applicable.

FIG. 1 illustrates an Interface to Network Security Functions (I2NSF) framework to which embodiments of the present disclosure is applicable. Referring to FIG. 1, an I2NSF system includes an I2NSF user 100, a security management system 200 and/or at least one NSF 300. The security management system 200 may include a security controller 250 and a developer's management system (DMS).

The I2NSF user 100 communicates with the security controller 250 through a Consumer-Facing Interface (CFI). The security controller 250 also communicates with NSF(s) 300 through an NSF-Facing Interface. The DMS communicates with the security controller 250 through a Registration Interface (RI).

I2NSF User

The I2NSF user is an I2NSF component that requests information from another I2NSF component (e.g., the security controller) and/or uses a service (e.g., network security service) provided by another I2NSF component (e.g., the developer's management system). For example, the I2NSF user may include an overlay network management system, an enterprise network manager system, other network domain manager, etc.

An object performing functions assigned to the I2NSF user component may be referred to as an I2NSF consumer. Examples of the I2NSF consumer may include a video-conference network manager that needs to dynamically give a notice to an underlay network so as to allow, rate-limit, or reject a flow based on a specific field of a packet for a time span; enterprise network administrators and management systems that need to request a vendor network so as to enforce a specific I2NSF policy for a specific flow; and an IoT management system that transmits a request to an underlay network so as to block a flow matching a set of specific conditions.

The I2NSF user may create and distribute a high-level security policy. More specifically, the I2NSF user needs to use a network security service to protect a network traffic from various malicious attacks. In order to request the network security service, the I2NSF user may create the high-level security policy for a security service that the I2NSF user desires, and may inform a network operator management system of the high-level security policy.

In a process of preparing the high-level security policy, the I2NSF user may not consider types of NSF(s) required to implement a security service or a security policy rule configuration for the respective NSF(s).

Further, the I2NSF user may be notified security event(s) generated in the underlying NSF(s) by the network operator management system. By analyzing the security event(s) of the NSF(s), the I2NSF user may recognize a new attack and update (or create) the high-level security policy for coping with the new attack. As described above, the I2NSF user may define, manage, and monitor the security policy.

Security Controller

The security controller is a component that performs functions of collection and distribution point for providing security, monitoring, and other actions. The security controller may be managed by a network security manager and may also be referred to as the network operator management system or an I2NSF management system.

One of major functions of the security controller is to translate the high-level security policy (or policy rule) from the I2NSF user into a low-level security policy rule for specific NSF(s). The security controller (or the network operator management system) may receive the high-level security policy from the I2NSF user, and then determine types of NSF(s) required to enforce a policy requested first by the I2NSF user. Further, the security controller (or the network operator management system) may create the low-level security policy for each requested NSF(s). As a result, the security controller (or the network operator management system) may configure the generated low-level security policy to each NSF(s).

The security controller (or the network operator management system) may monitor the NSF(s) that is being driven in the system, and may maintain a variety of information (e.g., network access information, a workload state, etc.) about each NSF(s). Further, the security controller (or the network operator management system) may dynamically manage a pool of an NSF instance through dynamic lifecycle management of the NSF instance with the help of the developer's management system.

NSF

The NSF is a logical entity or a software component that provides a security-related service. For example, the NSF may receive the low-level security policy and may detect and block or attenuate a malicious network traffic based on the low-level security policy. Hence, integrity and confidentiality of a network communication stream can be secured.

Developer's Management System

The developer's management system is an I2NSF component that sends information to another I2NSF component (e.g., the I2NSF user, the security controller, etc.) and/or provides a service (e.g., the network security service). The developer's management system may be referred to as a vendor's management system. An object that performs a function assigned to the developer's management system may be referred to as an I2NSF producer.

The developer's management system may be managed by a third-party security vendor that provides the NSF(s) to the security controller. Multiple developer's management systems of various security vendors may exist.

Consumer-Facing Interface (CFI)

The CFI is an interface to the I2NSF system of the user, positioned between the I2NSF user and the security controller. By being designed in this way, only an abstract view of the NSF(s) is provided to the user with the details of underlying NSF(s) hidden.

The CFI may be used to enable different users of a given I2NSF system to define, manage, and monitor a security policy for a specific flow in a management domain. The high-level security policy (or policy rule) created by the I2NSF user may be delivered to the network operator management system via the CFI.

NSF-Facing Interface (NFI)

The NFI is an interface positioned between the security controller (or the network operator management system) and the NSF(s).

The NFI may be used to designate and monitor a flow-based security policy enforced by one or more NSFs. For example, the I2NSF system may use a flow-based NSF. The flow-based NSF is an NSF that examines a network flow based on a set of policies to enhance security characteristics. Flow-based security by the flow-based NSF means that packets are examined in the order they are received, and there is no correction for the packets based on an examination process.

The I2NSF management system does not need to use all capabilities of a given NSF and does not need to use all the available NSFs. Accordingly, this abstraction enables an NSF feature to be handled as a building block by an NSF system. Therefore, a developer can freely use a security capability defined by an individual NSF for a vendor and a technology.

Registration Interface (RI)

The RI is an interface positioned between the security controller and the developer's management system. The NSFs provided by different vendors may have different capabilities. Thus, in order to automate a process that uses various types of security capabilities provided by different vendors, the vendors need to have a dedicated interface for determining the capabilities of their NSFs. The dedicated interface may be referred to as I2NSF registration interface (RI).

The capability of the NSF may be pre-configured or may be dynamically searched via the I2NSF RI. If a new capability exposed to a consumer is added to the NSF, the new capability needs to be registered on an I2NSF registry via the I2NSF RI so that an interested management and control entity can know the capability.

Hereinafter, the present disclosure proposes the guidelines for security policy conversion in the I2NSF framework [RFC8329]. First, the present disclosure explains the necessity of a security policy converter in the I2NSF framework will be described.

The policy converter resides in a security controller of the I2NSF framework and converts a higher-level security policy to a lower-level security policy for Network Security Functions (NSF). A high-level policy is specified by an I2NSF User in the I2NSF framework and is delivered to the security controller via a Consumer-Facing Interface (CFI). It is translated into a low-level policy by a policy translator in the security controller and is delivered to NSFs to execute the rules corresponding to the low-level policy via an NSF-Facing Interface (NFI).

Necessity for Security Policy Translator

The security controller acts as a coordinator between the I2NSF user and the NSFs. Also, the security controller has capability information of NSFs that are registered via a Registration Interface (RI) by Developer's Management System [RFC8329]. As a coordinator, the security controller needs to generate a low-level policy in the form of security rules intended by the high-level policy, which can be understood by the corresponding NSFs.

The high-level and low-level security policies are specified by YANG data model [RFC7950] with the delivery using either NETCONF [RFC6241] or RESTCONF [RFC8040]. Conversion from a high-level security policy into the corresponding low-level security policy will be able to rapidly elevate I2NSF in real-world deployment. A rule in a high-level policy may include a broad target object, such as employees in a company for a security service (e.g., firewall and web filter). Such employees may be from human resource (HR) department, software engineering department, and advertisement department. A keyword of employee needs to be mapped to these employees from various department. This mapping needs to be handled by a security policy converter in a flexible way while understanding the intention of a policy specification. Let's consider the following two policies:

Block my son's computers from malicious websites.

Drop packets from the IP address 192.0.2.0/24 to malicious1 and malicious2.

The above two sentences are examples of policies for blocking malicious websites. The both policies are for the same operation. However, NSF cannot understand the first policy, because the policy does not have any specified information for NSF. To set up the policy at an NSF, the NSF must receive at least the source IP address and website address for an operation. It means that the first sentence is not compatible for an NSF policy. Conversely, when an I2NSF user requests a security policy to the system, the user does not make a security policy like the second example. In order to create a security policy like the second sentence, the user must know that NSF needs to receive the specified information, source IP address and website address. It means that the user understands the NSF professionally, but there are not many professional users in a small size of company or at a residential area. In conclusion, the I2NSF user prefers to issue a security policy in the first sentence, but an NSF may require the same policy as the second sentence with specific information. Therefore, an advanced translation scheme of security policy is REQUIRED in I2NSF.

In the present disclosure, there is proposed an approach using Automata theory for the policy translation, such as Deterministic Finite Automaton (DFA). The Automata theory is the foundation of programming language and compiler. Thus, with this approach, the I2NSF user is able to easily specify a high-level security policy that will be enforced into the corresponding NSFs with a compatibly low-level security policy with the help of the security policy translator. Also, for easy management, a modularized translator structure is proposed.

Relation Between Consumer-Facing Interface and NSF-Facing Interface YANG Data Models The Consumer-Facing Interface (CFI) YANG data model and NSF-Facing Interface (NFI) YANG data model are two data models designed with different objectives in mind. The CFI is designed to be used by someone with little knowledge of network security, and may configure the NSFs by specifying the required information, their data types, and encoding schemes as a high-level policy. The NFI is designed to provide detailed security policy configuration for the NSFs as a low-level policy that can be used by the NSFs to deploy security services. However, even with the distinct objectives for the data models, the attributes between the two data models are constructed to have a relation for the purpose of automation. Thus, this section provides the information of the relationship between the attributes in the CFI and NFI YANG data model.

Comparison of CFI and NFI Top-Level YANG Trees

FIG. 2 is a diagram showing a comparison in the top-level of the Consumer-Facing Interface (CFI) and NSF-Facing Interface (NFI) YANG Trees. The CFI and NFI top-level provide the basic security policy information such as name of a policy, language tag, and resolution-strategy. Both data models also provide list of rules to be executed to perform the network security services.

The differences of the top-level data models are default action and priority usage are not provided in CFI YANG data model. This is because of the philosophy of CFI, i.e., to make CFI as simple as possible for a user. However, this attributes may be given by the security controller with a default value in the translation process. Another important distinct point is that CFI YANG data model also provides endpoint groups and threat prevention to register high-level information (e.g., mapping a user to an IP address) to the database for high-level configuration that can be used to convert the high-level policy into the low-level policy.

Comparison of CFI and NFI Rule-Level YANG Trees

FIG. 3 is a diagram showing comparison between CFI and NFI Rule-Level YANG trees. Similarly to the top-level YANG data model, the long-connection is not provided in the CFI YANG data model to simplify the data model for the user configuration. This value can also be added using a default value in the Security Controller for the low-level security policies.

In term of similarity, the CFI and NFI YANG data model provides the basic rule information such as the unique name the priority value for the rules. Both data models utilize the Event-Condition-Action (ECA) policy rule.

Comparison of CFI and NFI Event YANG Data Models

FIG. 4 is a diagram showing comparison between CFI and NFI Event YANG trees. CFI and NFI YANG data models have the almost same structures for Event except for description in NFI. The description is optional because it contains human-readable text for the description of an event.

Comparison of CFI and NFI Condition YANG Data Models

FIGS. 5A to 5H are diagrams illustrating comparison between CFI and NFI Condition YANG trees. The drawings show a different way to manipulate the Access Control Lists (ACLs) for the CFI and NFI YANG data models. The CFI aims at an easy security policy configuration, thus only provides a simple and most often needed fields in ACIs, i.e., source and destination address (IPv4 or IPv6), type of transport protocol, source and destination port numbers, type of application protocol, and ICMP type and code. On the other hand, the NFI imports from [RFC8519] to provide a detailed configuration of packet header.

Additionally, both data models provide configuration for advanced network security functions such as DDoS, Antivirus, Payload (DPI), URL Filtering, and Voice Filtering conditions. The difference is that in CFI some of the information (name, value) for configuration is saved into a database in the security controller for easy configuration. The configuration may be done by using the key name that holds the corresponding value.

The YANG data models also has context condition that can be one to one mapped, such as time condition to define the active period of a rule or geographic location condition to filter traffic from/to a certain region that can be mapped into the source and destination IP (IPv4 or IPv6) addresses based on the database provided.

Comparison of CFI and NFI Action YANG Data Models

FIG. 6 is a diagram showing comparison between CFI and NFI Action YANG trees. The action in CFI YANG data model is separated into primary-action and secondary-action. The primary action is the Ingress and Egress action (i.e., pass, drop, reject, rate-limit, mirror, invoke-signaling, tunnel-encapsulation, forwarding, and transformation) in the NFI YANG data model. The secondary-action is the log-action to log the rule that has been triggered by a packet/flow or log the packet/flow that triggered the rule. The NFI also may specify an action as packet or flow action depending on the capability of the NSF.

In NFI YANG data model, the advanced action is used to activate the Service Function Chaining (SFC) to apply multiple NSFs on network traffics. This does not exist in CFI as the CFI is used to provide a high-level action. The action of a certain policy in CFI may require multiple NSFs (e.g., a URL filtering with firewall) as a single NSF may not have the capability to handle the security policy. Thus, the SFC of the corresponding NSFs is handled by the NFI.

Design of Security Policy Translator

Commonly used security policies are created as Extensible Markup Language (XML) files. A popular way to change the format of an XML file is to use an Extensible Stylesheet Language Transformation (XSLT) document. XSLT is an XML-based language to transform an input XML file into another output XML file. However, the use of XSLT makes it difficult to manage the security policy translator and to handle the registration of a new capability of NSFs. With the necessity for a security policy translator, a security policy translator based on Automata theory will be described in the present disclosure.

FIG. 7 is a flowchart illustrating a method for a security controller to translate a security policy for Interface to Network Security Functions (I2NSFs) according to an embodiment of the present disclosure. Here, a security controller may be connected to the I2NSF user via the Consumer-Facing Interface (CFI) to receive a higher-level policy and deliver the high-level policy to NSFs so as to execute rules corresponding to a low-level policy via the NSF-Facing Interface (NFI)

In operation S710, the security controller extracts data from the higher-level policy received from the I2NSF user. In this process, the data may be extracted through state transition from the higher-level policy using Deterministic Finite Automaton (DFA).

In operation S730, the security controller convert the data extracted through operation S710 into a capability of a target Network Security Function (NSF) of the security policy, by referring to mapping information between elements of a higher-level data model and elements of a lower-level data model. In this process, a target NSF for providing a security service may be selected using the extracted data, and the extracted data may be converted into a capability of the selected target NSF. In addition, in selecting the target NSF, the target NSF may be searched only with the higher-level policy data by comparing the extracted data with information on the capability of the NSF possessed by the security controller.

Meanwhile, in operation S730, the higher-level policy data may be converted into lower-level policy data compatible with the target NSF by referring to an NSF database including endpoint information and NSF capability information. Here, the endpoint information is received as a high-level policy from the I2NSF user to apply a security policy, the NSF capability information may be received from the DMS to indicate a feature supported by NSF, and the NSF database may be constructed based on the received endpoint information and the NSF capability information.

In addition, in operation S730, in the mapping information, higher-level data model and lower-level data model may be respectively converted into tree graphs, a tree edit distance between elements of the converted tree graphs may be calculated, and similar elements between data models may be stored as mapping candidates by using calculated minimum distances.

In operation S750, the security controller generates a low-level policy to execute the NSF capabilities. In this process, the low-level data and low-level attributes are combined in pairs to generate a low-level policy in an Extensible Markup Language (XML) or JavaScript Object Notation (JSON) form for the target NSF.

Figure 8:
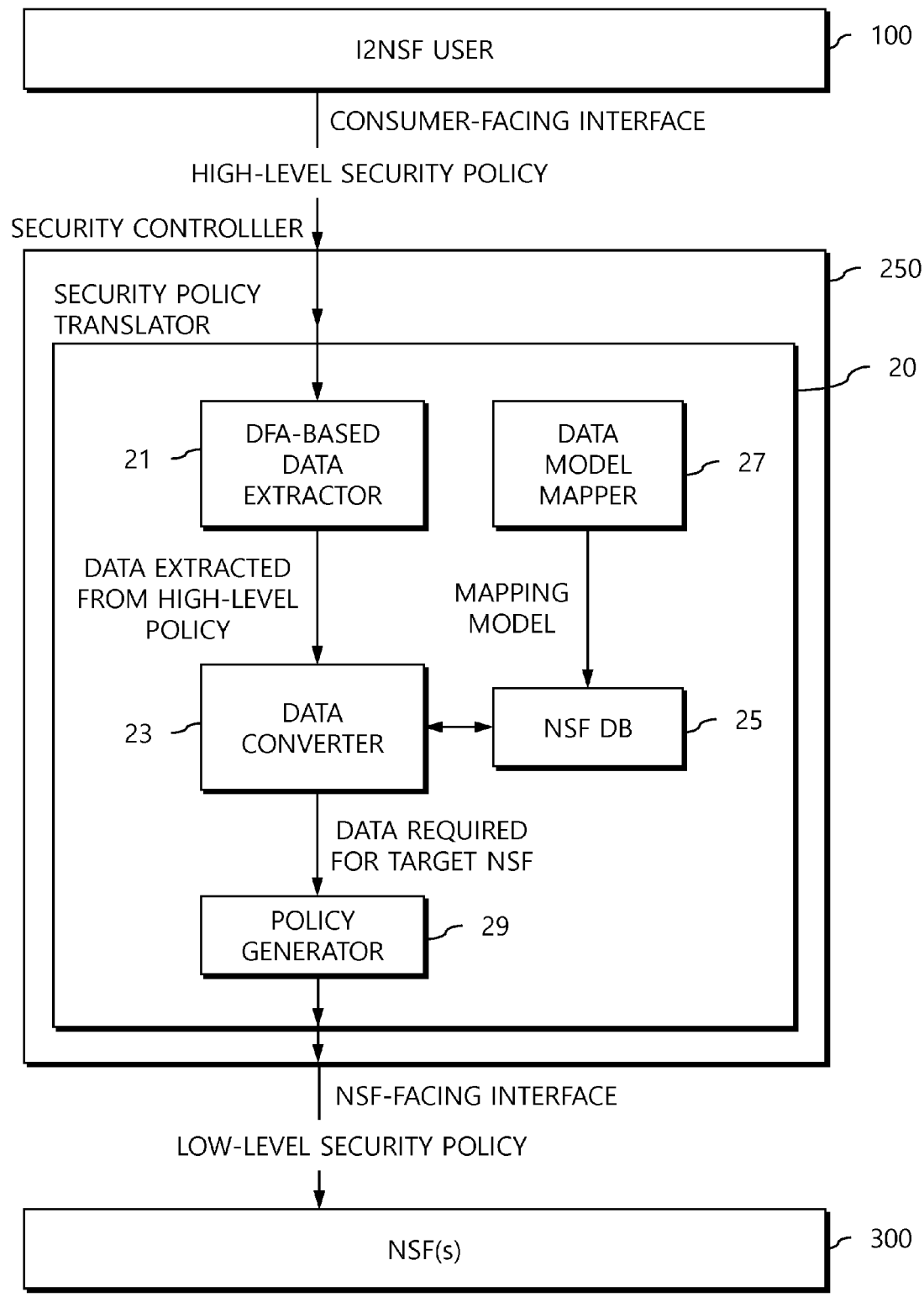
FIG. 8 is a block diagram illustrating an apparatus for translating a security policy for Interface to Network Security Functions (I2NSF) according to an embodiment of the present disclosure.

FIG. 8 is a block diagram illustrating an apparatus for translating a security policy for Interface to Network Security Functions (I2NSF) according to an embodiment of the present disclosure. Each operations described above in FIG. 7 is reconstructed from the apparatus configuration point of view. A security policy converter 20 includes the components of a data extractor 21, a data translator 23, a policy generator 29, and a data model mapper 27. The security controller 250 may be connected to the I2NSF user via the Consumer-Facing Interface (CFI) to receive a higher-level policy and deliver the high-level policy to NSFs so as to execute rules corresponding to a low-level policy via the NSF-Facing Interface (NFI).

The data extractor 21 is a Deterministic Finite Automaton (DFA)-based module for extracting data from A high-level policy delivered by an I2NSF user 100 through a Consumer-Facing Interface (CFI). The data model mapper 27 creates a mapping model for mapping elements between the CFI and the NFI. The data converter 23 converts the extracted data into a capability of a target NSF for lower-level policy. The NSF database 25 refers to an NSF database 25 to convert an abstract subject or object to corresponding a concrete subject or objects(e.g., IP address and website URL). The policy generator 29 generates a low-level policy to execute the NSF capability from a converter.

DFA-Based Data Extractor

Design of DFA-Based Data Extractor

Figure 9:
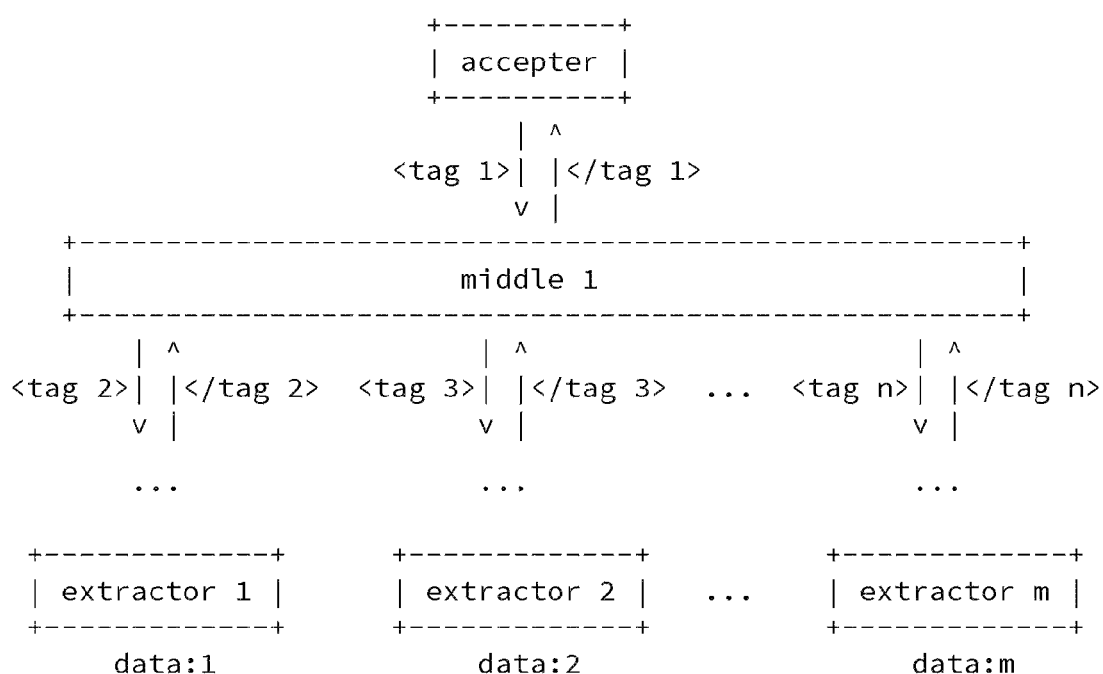
FIG. 9 shows the architecture of a Deterministic Finite Automaton (DFA)-based data extractor.

FIG. 9 shows the architecture of a Deterministic Finite Automaton (DFA)-based data extractor. If a high-level policy contains data according to a hierarchical structure of the standard consumer-facing interface YANG data model, the data may be easily extracted using a state transition machine such as the Deterministic Finite Automaton (DFA). The extracted data may be processed by an NSF so that the extracted data can be understood. The data extractor may be constructed by designing a DFA with the same hierarchical structure as a YANG data model.

After constructing a DFA, the data extractor may extract all of data in the entered high-level policy by using state transitions. Also, the DFA may easily detect the grammar errors of the high-level policy. The extracting algorithm of Data Extractor is as follows:
  1. Start from the 'accepter' state.
  2. Read the next tag from the high-level policy.
  3. Transit to the corresponding state.
  4. If the current state is in 'extractor', extract the corresponding data, and then go back to step 2.
  5. If the current state is in 'middle', go back to step 2.
  6. If there is no possible transition and arrived at 'accepter' state, the policy has no grammar error. Otherwise, there is a grammar error, so stop the process with failure.

In summary, the data extractor may extract data through state transition from the higher-level policy using the DFA.

Example Scenario for Data Extractor

Figure 11:
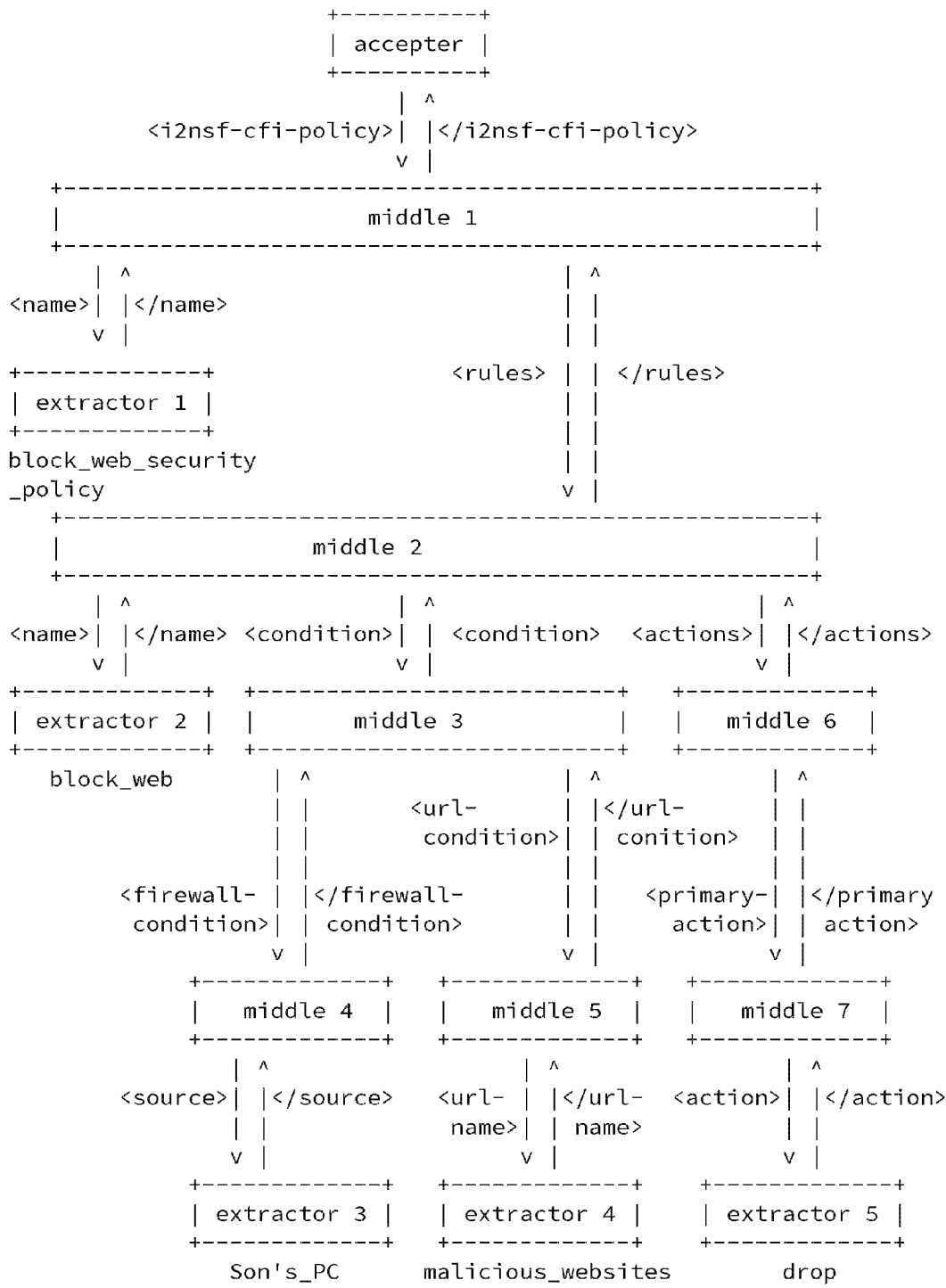
FIG. 11 is a diagram illustrating the architecture of a data extractor.

FIG. 10 is a diagram illustrating a high-level policy, and FIG. 11 is a diagram illustrating an architecture of a data extractor. To explain the Data Extractor process by referring to an example scenario, assume that a security controller has received a high-level policy for web-filtering, as shown in FIG. 10. Then, a DFA-based data extractor may be constructed by using the design as shown in FIG. 9. FIG. 11 shows the architecture of a data extractor based on the architecture of FIG. 9 along with the input high-level policy of FIG. 10. A data extractor may automatically extract all of data in the high-level policy according to the following process:
  1. Start from the 'accepter' state.
  2. Read the first opening tag called '<i2nsf-cfi-policy>', and transit to the 'middle 1' state.
  3. Read the second opening tag called '<name>', and transit to the 'extractor 1' state.
  4 The current state is an 'extractor' state. Extract the data of 'name' field called 'block_web_security_policy'.
  5. Read the second closing tag called '</name>', and go back to the 'middle 1' state.
  6. Read the third opening tag called '<rules>', and transit to the 'middle 2' state.
  7. Read the fourth opening tag called '<name>', and transit to the 'extractor 2' state.
  8. The current state is an 'extractor' state. Extract the data of 'name' field called 'block_web'.
  9. Read the fourth closing tag called '</name>', and go back to the 'middle 2' state.
  10. Read the fifth opening tag called '<condition>', and transit to the 'middle 3' state.
  11. Read the sixth opening tag called '<firewall-condition>', and transit to the 'middle 4' state.
  12. Read the seventh opening tag called '<source>', and transit to the 'extractor 3' state.
  13. The current state is an 'extractor' state. Extract the data of 'source' field called 'Son's_PC'.
  14. Read the seventh closing tag called '</source>', and go back to the 'middle 4' state.
  15. Read the sixth closing tag called '</firewall-condition>', and go back to the 'middle 3' state.
  16. Read the eight opening tag called '<url-condition>', and transit to the 'middle 5' state.
  17. Read the ninth opening tag called '<url-name>', and transit to the 'extractor 4' state.
  18. The current state is an 'extractor' state. Extract the data of 'url-name' field called 'malicious websites'.
  19. Read the ninth closing tag called '</url-name>', and go back to the 'middle 5' state.
  20. Read the eight closing tag called '</url-condition>', and go back to the 'middle 3' state.
  21. Read the fifth closing tag called '</condition>', and go back to the 'middle 2' state.
  22. Read the tenth opening tag called '<actions>', and transit to the 'middle 6' state.
  23. Read the eleventh opening tag called '<primary-action>', and transit to the 'middle 7' state.
  24. Read the twelfth opening tag called '<action>', and transit to the 'extractor 5' state.

25. The current state is an 'extractor' state. Extract the data of 'action' field called 'drop'.
26. Read the twelfth closing tag called '</action>', and go back to the 'middle 7' state.
27. Read the eleventh closing tag called '</primary-action>', and go back to the 'middle 6' state.
28. Read the tenth closing tag called '</actions>', and go back to the 'middle 2' state.
29. Read the third closing tag called '</rules>', and go back to the 'middle 2' state.
30. Read the first closing tag called '</i2nsf-cfi-policy>', and go back to the 'accepter' state.
31. There is no further possible transition, and the state is finally on 'accepter' state. There is no grammar error in FIG. 8, so the scanning for data extraction is finished.

The above process is constructed by an extracting algorithm. When all of the above processes are completed, the data extractor may extract all data of 'block_web_security_policy', 'block_malicious', 'Son's_PC', 'malicious_websites', 'drop' in FIG. 10.

Since the translator is modularized into a DFA structure, a visual understanding is feasible. Also, the performance of the data extractor is excellent compared to one-to-one searching of data for a particular field. In addition, the management is efficient because the DFA completely follows the hierarchy of the CFI. If an I2NSF user wants to modify the data model of a high-level policy, it only needs to change the connection of the relevant DFA node.

Data Converter

Role of Data Converter

Every NSF has its own unique capabilities. The capabilities of an NSF are registered into Security Controller by a Developer's Management System, which manages the NSF, via Registration Interface. Therefore, the security controller already has all information about the capabilities of NSFs. This means that the security controller is able to find target NSFs with only the data (e.g., subject and object for a security policy) of the high-level policy by comparing the extracted data with all capabilities of each NSF. This search process for appropriate NSFs is called by policy provisioning, and it eliminates the need for an I2NSF user to specify the target NSFs explicitly in a high-level security policy.

The data converter selects target NSFs and converts the extracted data into the capabilities of selected NSFs. If the security controller uses this data convertor, it is possible to provide the policy provisioning function to an I2NSF user automatically. Thus, the design of the converter provides big benefits to the I2NSF Framework.

In summary, the data converter may select a target NSF for providing a security service by using the extracted data, and may convert the extracted data to a capability of the selected target NSF. In addition, the data converter may be further configured to compare the extracted data with information on capabilities of NSFs possessed by the security controller to search for a target NSF only with higher-level policy data.

NSF Database

The NSF database contains all the information needed to convert high-level policy data to low-level policy data. The contents of NSF Database are classified as the following two: "endpoint information" and "NSF capability information".

The first is "endpoint information". Endpoint information is necessary to convert an abstract high-level policy data such as Son's_PC and malicious websites to a specific low-level policy data such as 192.0.2.0/24 and malicious1, respectively. In the high-level policy, a range of endpoints for applying security policy needs to be provided abstractly. Thus, endpoint information is needed to specify the abstracted high-level policy data. Endpoint information is provided by an I2NSF user as the high-level policy through the Consumer-Facing Interface (CFI), and the security controller builds the NSF-Facing Interface (NFI) database based on received information.

The second is "NSF capability information". Since capability is information that allows NSF to know what features it can support, NSF capability information is used in policy provisioning process to search the appropriate NSFs through the security policy. NSF capability information is provided by a Developer's Management System (DMS) through a Registration Interface (RI), and the security controller builds an NSF database based on received information. In addition, if the NSF sends monitoring information such as initiating information to the security controller through the NSF-Facing Interface (NFI), the security controller may modify the NSF database accordingly.

Figure 12:
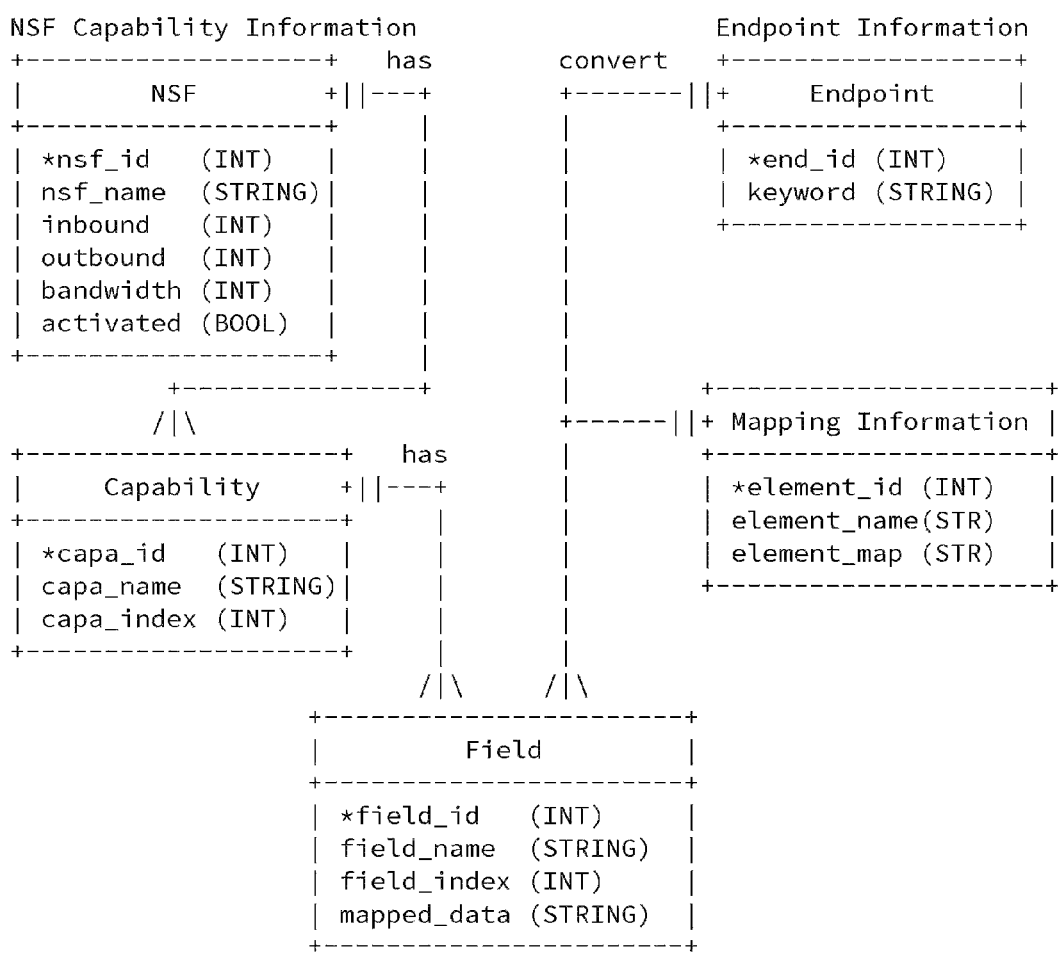
FIG. 12 illustrates an Entity-Relationship Diagram (ERD) of an NSF database.

FIG. 12 illustrates an Entity-Relationship Diagram (ERD) of an NSF database designed to include both endpoint information received from an I2NSF user and NSF capability information received from a DMS. By designing the NSF database based on the ERD, all the information necessary for security policy translation may be stored, and the network system administrator may manage the NSF database efficiently.

The ERD is expressed by using Crow's Foot notation. Crow's Foot notation represents a relationship between entities as a line and represents the cardinality of the relationship as a symbol at both ends of the line. Attributes prefixed with * are key values of each entity. A link with two vertical lines represents one-to-one mapping, and a bird-shaped link represents one-to-many mapping. An NSF entity stores the NSF name (nsf_name), NSF specification (inbound, outbound, bandwidth), and NSF activation (activated). A Capability entity stores the capability name (capa_name) and the index of the capability field in a Registration Interface YANG data model (capa_index). An Endpoint entity stores the keyword of abstract data conversion from an I2NSF user. A Field entity stores the field name (field_name), the index of the field index in an NSF-Facing Interface YANG data model, and converted data by referring to the Endpoint entity and a 'convert' relationship.

In summary, the data converter may convert high-level policy data into low-level policy data compatible with a target NSF by referring to the NSF database including endpoint information and NSF capability information. Here, the endpoint information is received as a high-level policy from the I2NSF user to apply a security policy, the NSF capability information may be received from the DMS to indicate a feature supported by NSF, and the NSF database may be constructed based on the received endpoint information and the NSF capability information.

Data Conversion in Data Converter

Figure 13:
FIG. 13 is a diagram illustrating data conversion.

FIG. 13 is a diagram illustrating data conversion. High-level policy data should be converted into low-level policy data which are compatible with NSFs. If a system administrator attaches a database to Data Converter, it is possible to convert contents by referring to the database with SQL queries. The data conversion of FIG. 13 is based on the following list:

'Policy Name' and 'Rule Name' fields do NOT need the conversion.

'Source' field SHOULD be converted into an IPv4 addresses.

'URL Name' field SHOULD be converted into a URL list of malicious websites.

'Action' field SHOULD be converted into the corresponding action(s) in NSF capabilities.

Data Model Mapper

When an I2NSF user sends a higher-level policy, the higher-level policy is encoded into an XML file based on a YANG data model to provide a standard model for configuration. Each piece of data in the high-level policy is contained in a different XML element to provide the semantics of the data. Each element of XML has a different purpose to implement a configuration. The same goes for a low-level policy where each piece of data to be sent required to be contained in the appropriate XML element so that an NSF can understand the low-level policy.

When translating a policy, mapping between elements of data models is necessary to properly convert the data, and it is necessary to know which higher-level XML element needs to be mapped to a lower-level XML element. Conventionally, the mapping between elements has been performed manually, but embodiments of the present disclosure propose a new component, that is, a data model mapper, to provide automatic mapping between a high-level element and a low-level element. The data model mapper creates a mapping model between the elements in Consumer-Facing Interface YANG data model and NSF-Facing Interface YANG data model. Each element of the Consumer-Facing Interface YANG data model has one or more corresponding elements of the NSF-Facing Interface YANG data model.

Figure 14:
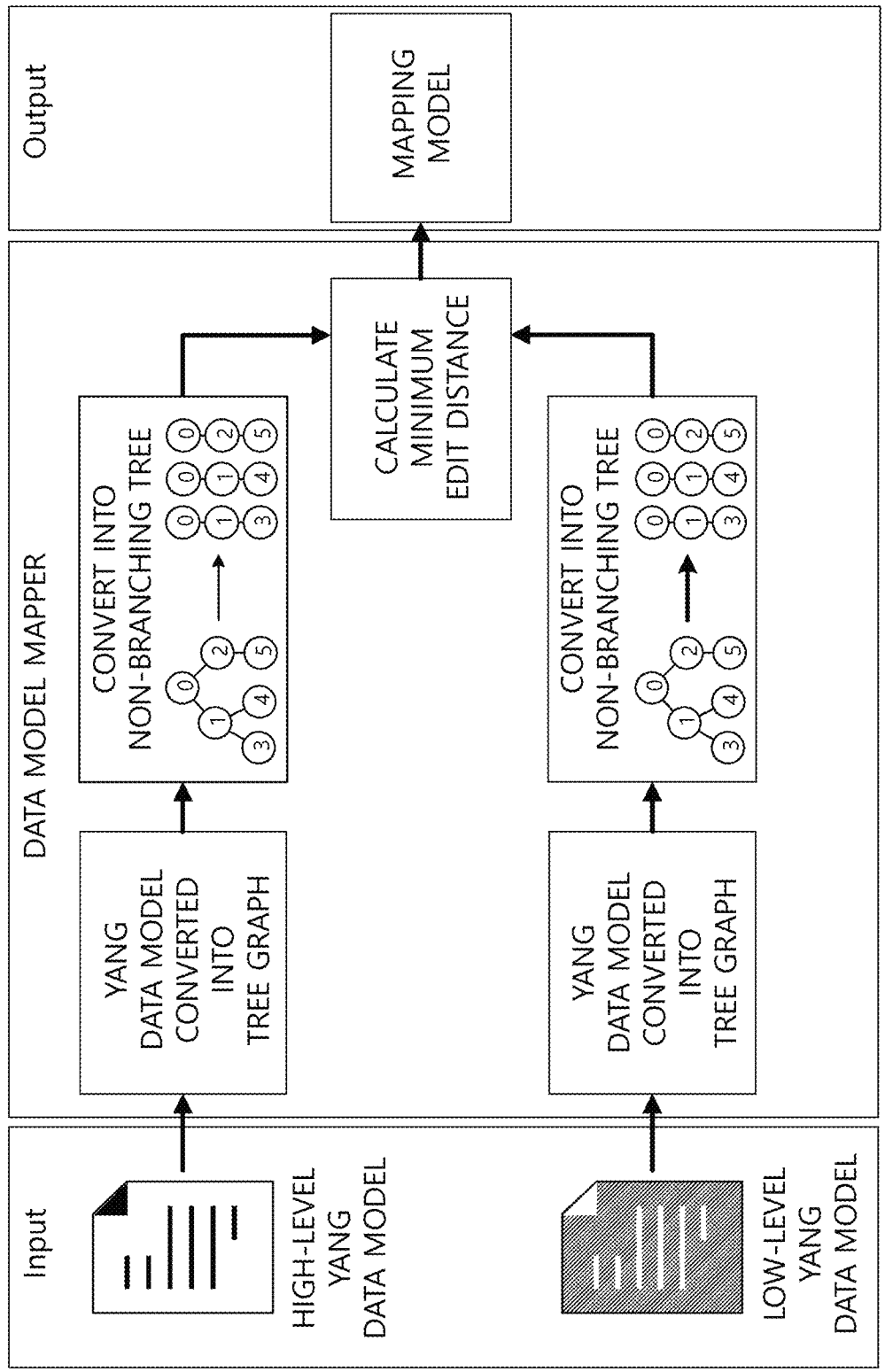
FIGS. 14 and 15 are a block diagram illustrating a process of an automatic data model mapper and a diagram illustrating data model mapping.
Figure 15:
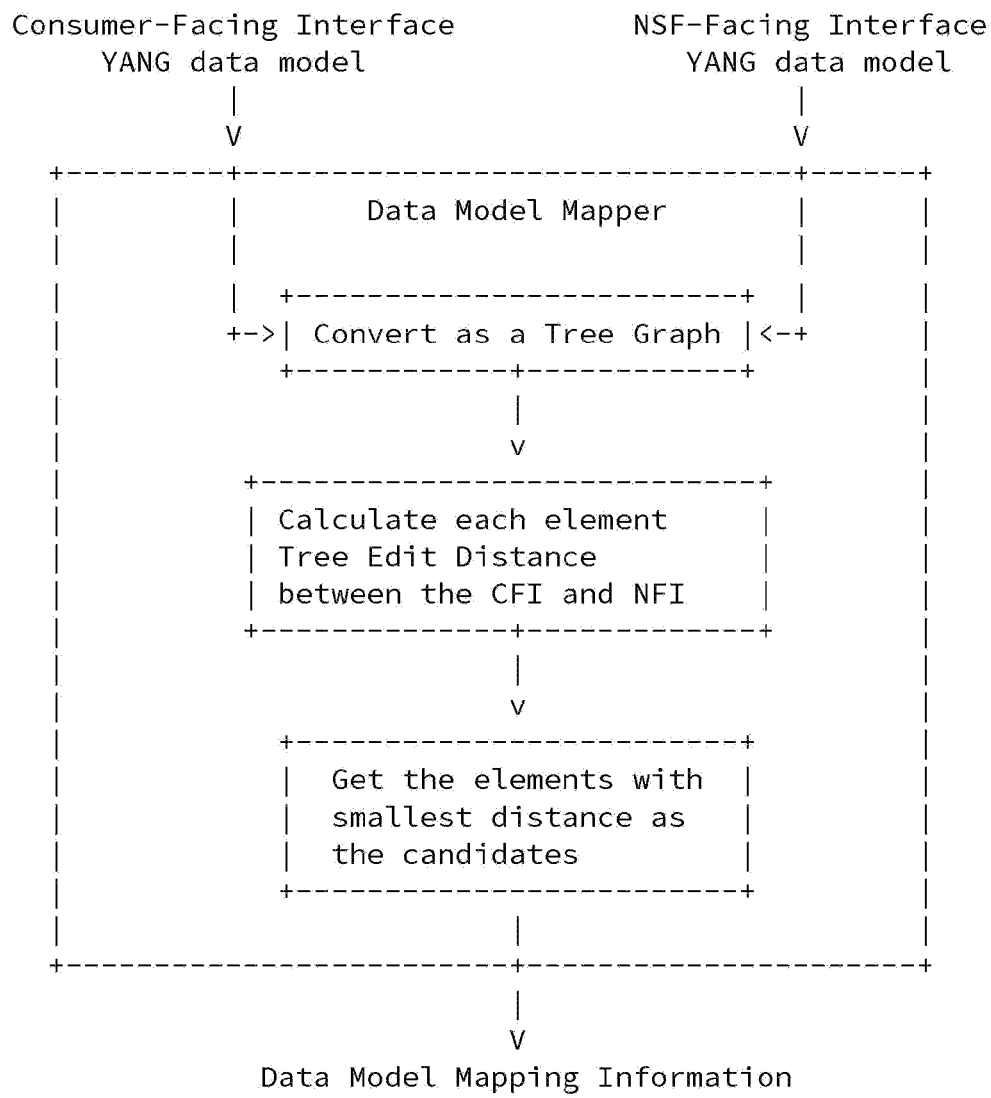

FIGS. 14 and 15 are a block diagram illustrating a process of an automatic data model mapper and a diagram illustrating data model mapping. In addition, FIG. 16 is a pseudocode illustrating an algorithm of the automatic data model mapper of FIG. 14.

Automatic mapping is useful as the CFI and NFI YANG data models can be extended. In order to create a mapping model, a high-level YANG data model and a low-level YANG data model are required as inputs. That is, the automatic mapper uses the CFI and NFI YANG data models as inputs. The automatic mapper processes the data models and converts the processed data models into tree graphs. A tree graph is used to process a data model as a tree instead of individual elements. Since the YANG data model can be automatically displayed as a simplified graphical diagram of a tree using a software tool such as "pyang", the two data models may be constructed into tree graphs using a parent-child relationship in a tree graph derived from the software tool. Referring to FIG. 16, as specified in line 3 of Algorithm 1, data model mapping starts at the root node of the high-level graph.

Then, a tree edit distance between the root node of the higher-level graph and every node of the lower-level graph is calculated. That is, the data model mapper calculates the tree edit distance between each element in Consumer-Facing Interface and each element in NSF-Facing Interface. A minimum distance represents a mapping from higher-level to lower level. Looping through all the children of the root starts, and a pair to calculate a distance to each child is generated. The pair may come from the parent's previous mapping. This is to reduce the number of calculations for distance and increase the accuracy of mapping.

To calculate the minimum distance, the tree edit distance may be calculated with an algorithm, e.g., Zhang-Shasha algorithm, and the calculation should start from the root of the tree.

The Zhang-Shasha algorithm calculates the distance by three operations:

Insert: Inserting a node or element

Delete: Deleting a node or element

Change: Change the label of a node or element to another

In each step, three operations are computed to find a minimum number that can be achieved. The insert and delete operations are a simple of adding/deleting a node or element with a length of a label of a node. To generate the distance, it is necessary to calculate a change operation between labels of elements. In order to calculate the change operation, the tree editing distance may be calculated using at least one of metrics such as Levenshtein distance, cosine similarity, or sequence matching.

Levenshtein Distance

Levenshtein distance is a metric for measuring the edit distance between two strings. The distance is calculated by obtaining a minimum number of single-character editing operations (i.e., insertion, deletion, and replacement) required to change one string to another. The Levenshtein distance may be calculated by Equation 1 below.

$$dist_{a,b}(i,j) = \begin{cases} \max(i,j), & \text{if } \min(i,j) = 0 \\ \min \begin{cases} dist_{a,b}(i-1,j)+1 \\ dist_{a,b}(i,j-1)+1 \\ dist_{a,b}(i-1,j-1)+1 \end{cases} & \text{otherwise} \end{cases} \quad \text{Equation 1}$$

Here, a: the first string to compare, b: the second string to compare, i: the position in string a, and j: the position of string b.

To calculate an edit distance between the strings a and b, $dist_{a,b}(|a|, |b|)$ is computed with Equation 1. Here, $|a|$ is the length of string a, and $|b|$ is the length of string b.

Cosine Similarity

Cosine similarity is a measure between two non-zero vectors. This technique may also be used to measure similarity between strings. The cosine similarity of strings is performed to measure word similarity between strings. The cosine similarity may be calculated by Equation 2 below.

$$\text{similarity}(a,b) = \frac{a \cdot b}{\|a\| \cdot \|b\|} \qquad \text{Equation 2}$$

$$= \frac{\sum_{i=1}^{n} a_i b_i}{\sqrt{\sum_{i=1}^{n} a_i^2} \sqrt{\sum_{i=1}^{n} b_i^2}}$$

Here, a: the first string to compare, and b: the second string to compare.

The result is between 0 and 1, where 0 indicates dissimilarity and 1 indicates the same. The following Equation 3 is derived to calculate a distance between the two strings.

$$\text{dist}(a,b) = (1 - \text{similarity}(a,b)) \times |a| \qquad \text{Equation 3}$$

To calculate the distance, the results are reversely construed to define 0 as the same and 1 as dissimilarity. This may be done by subtracting 1 from the similarity. Then, the distance is multiplied by $|a|$. For implementation, the length of a may be used to ensure that all calculations are normalized to the same value for distance comparison between nodes. Using Equation 3, a distance between two strings for a tree edit distance model may be calculated.

Sequence Matching

Sequence matching is a technique for comparing sequences of strings, and measures a sequence similarity between two strings. The sequence matching may be calculated by Equation 4 below.

$$\text{similarity}(a, b) = \frac{2 \times M(a, b)}{|a| + |b|} \quad \text{Equation 4}$$

Here, a: the first string to compare,
b: the second string to compare,
M(a, b): the number of coincidences between A and B,
|a|: the length of a, and
|b|: the length of b.

A result of Equation 4 is a ratio between 0 and 1, and it is necessary to transform the formula to calculate a distance. Using an approach similar to Equation 3, it is possible to calculate a distance between two strings. After transforming the formula, a distance using sequence matching may be calculated.

In the embodiments of the present disclosure, for the data model mapper, cosine similarity may be the best choice since the cosine similarity measures a similarity between words. The data models have similarity between words and may be helpful in calculating as a minimum distance as possible.

When the minimum distance is obtained, the NSF-Facing Interface element is saved as the candidates for mapping the Consumer-Facing Interface element. This information may be saved to the NSF database for the data converter.

In summary, in the mapping information, the higher-level data model and the lower-level data model may be respectively converted into tree graphs by a data model mapper, a tree editing distance between respective elements of the converted tree graphs may be calculated, and similar elements between data models may be stored as mapping candidates by using calculated minimum distances.

It is worth noting that the proper mapping can be achieved because the similarity between the Consumer-Facing Interface and NSF-Facing Interface. An extension created for the Consumer-Facing Interface and NSF-Facing Interface should keep the close similarity relationship between the data models to be able to produce the mapping model information automatically.

FIGS. 17A to 17E show mapping information for data conversion between the CFI YANG data model and the NFI YANG data model, and explain in detail a process of delivering data values to corresponding data fields of the data model after the data conversion. The mapping lists shown in FIGS. 17A to 17E show all mapped components. This data list should be stored in the NSF database to provide mapping information for data conversion. Since the consumer-facing interface and the NSF-facing interface can be extended at any time by vendors according to a provided NSF, it is important to automatically generate a mapping list. The mapping model information should be automatically generated using the data model mapper of the security policy translator.

Handling of Default Values for Low-level Security Policy

Attributes of the NFI YANG data model provide detailed configuration for an NSF to handle thorough examination of the network's security services. Some of the attributes in the NFI YANG data model may be provided immediately after mapping translation from a high-level policy. However, since the CFI YANG data model is designed to be easily used by an I2NSF user, some attributes cannot be directly mapped to the attributes in the NFI YANG data model.

To accommodate such attributes that cannot be provided by the direct translation from the CFI YANG data model, default values may be used. For example, the attribute "default-action" in the NFI YANG data model cannot be configured by the CFI YANG data model. A firewall usually drops packets by default to make sure that only permitted packets are allowed to pass through to the network. Thus, the default value for the attribute "default-action" will be a "drop" action. This may be done in the implementation of the translation so that the attribute can be given a default value.

The default values for different NSFs may vary according to a type of service. A typical firewall may use the default-value "drop" for the "default-action" attribute, but an anti-virus may use a default-value "pass" for "default-action" to make sure that only the detected viruses are blocked. Other types of firewalls may also use different default values for the "default-action".

Policy Provisioning

The generator searches for proper NSFs which can cover all of capabilities in the high-level policy. The generator searches for target NSFs by comparing only NSF capabilities which is registered by a vendor management system. This process is called by "policy provisioning" because the generator searches proper NSFs by using only the policy. If the target NSFs are found by using other data which is not included in a user's policy, it means that the user already knows the specific knowledge of an NSF in the I2NSF Framework.

Figure 18:
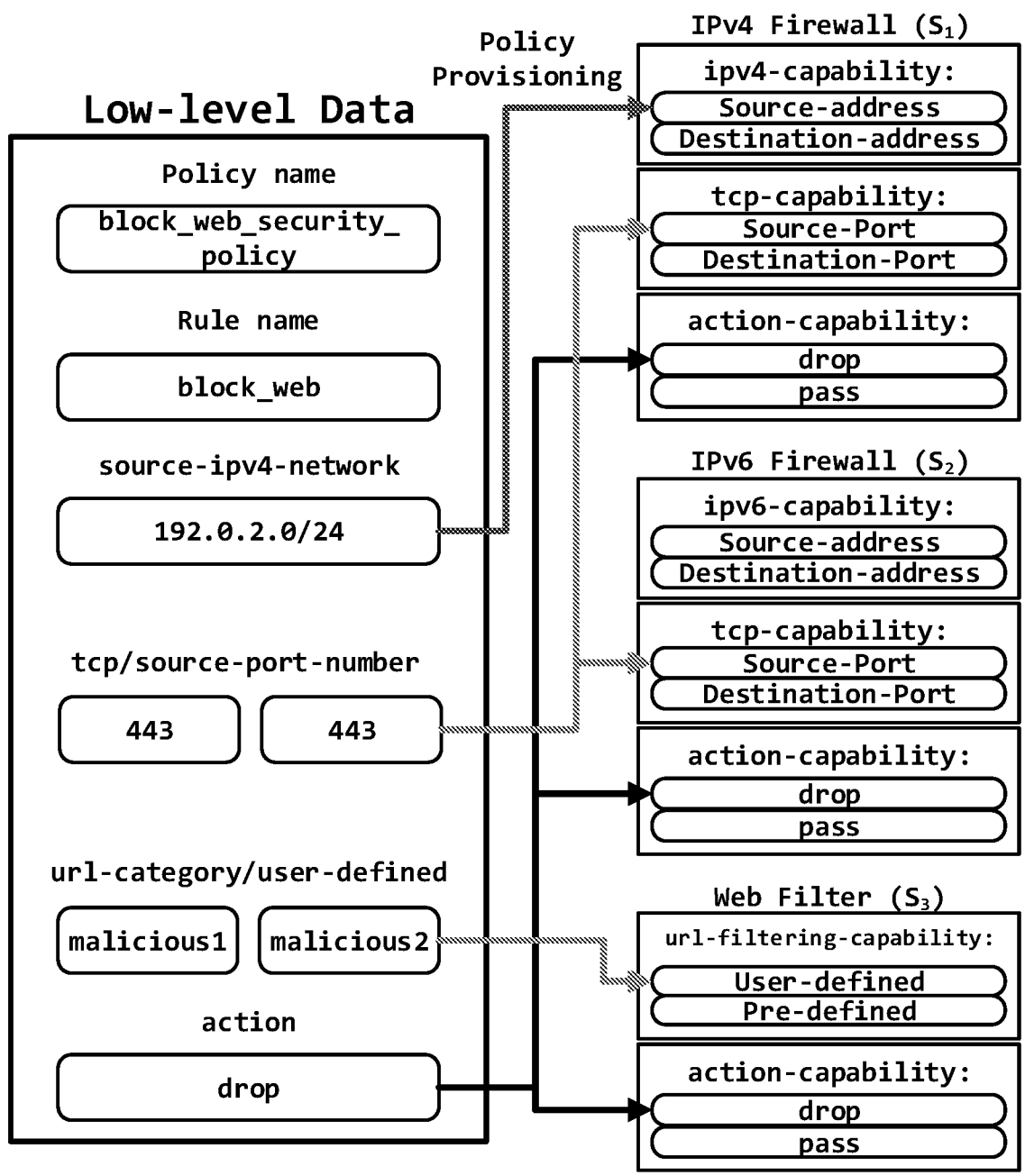
FIG. 18 is a diagram illustrating policy provisioning.

FIG. 18 is a diagram illustrating policy provisioning. In this example, IPv4 Firewall NSF and Web Filter NSF are selected to address the capabilities of the security policy. All capabilities may be addressed by two selected NSFs.

The policy provisioning function is designed to select the appropriate NSFs to regulate the elements in the system. To do this, the function aims to meet two requirements: (1) each element must be regulated by an NSF, and (2) the number of NSFs involved in the regulation of the security policy should be minimized in order to optimize resource and network usage. This means that the function should fully apply the request of the I2NSF User and use as few NSFs as possible to optimize the regulation of the security policy.

For this optimization, we propose a Policy Provisioning algorithm as shown in FIG. 19. The algorithm takes a single input called convertedData, which is the output of a conversion process using the database. In line 2, the algorithm uses convertedData to determine the capabilities needed by the system, referred to as the universe. Then, in line 3, the algorithm takes the universe as input and returns a set of NSFs that have at least one capability that covers the universe. In line 4, the algorithm uses both the universe and the set of subsets as inputs and returns a set of NSFs as the solution. This set of NSFs will be used to implement the given security policy.

The approach to find the solution for line 4 can be done with the optimization approach of linear programming. Equation 4 is used as the objective function, which is minimizing the cost of selected NSFs. Equation 5 is the problem constraint to find the solution of the NSFs that can provide the security services. By calculating these equations, the optimal NSFs that can cover the security policy can be selected.

$$\text{minimize} \sum_{j=1}^{n} c_j x_j \qquad \text{Equation 4}$$

$$\text{subject to } \sum_{j=1}^{n} a_{ij} x_j \geq b_i \; i = 1, \ldots, m \qquad \text{Equation 5}$$

$$x_j \geq 0 \; j = 1, \ldots n$$

The convertedData loop in lines 6 through 16 provisions each NSF with the appropriate security policies. Inside the loop, the function first checks if the current NSF is capable of handling the current key. If it is, the function then checks if the key includes the word "action" and if the current index is less than the number of NSFs minus 1. This checking ensures that the security policies can activate the Service Function Chaining by forwarding a packet to the next appropriate NSF. If either of these conditions is not met, the value for the key in the results dictionary (i.e., Results) is set to the original value from the convertedData input. Otherwise, the value is set to the next NSF in the set. After all key/value pairs have been processed, the results dictionary (i.e., Results) is returned and will be used in the Policy Generator process.

Policy Generator

The generator generates a low-level security policy for each target NSF with the extracted data. The low-level security policy may be generated in the form of XML or JSON. A library such as PyangBind for Python may be used to parse the NFI YANG data model to produce an XML or JSON form automatically.

Figure 20:
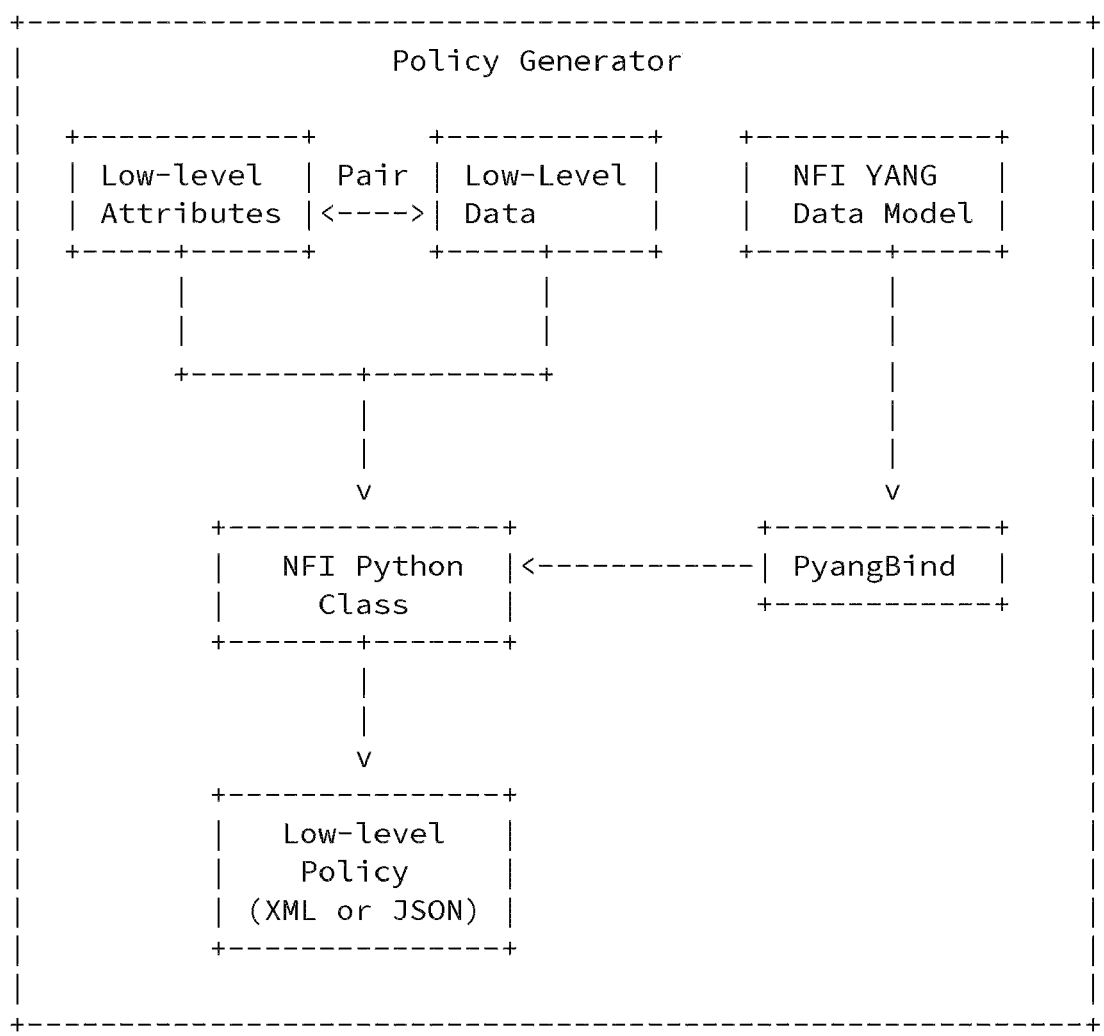
FIG. 20 is a block diagram illustrating the architecture of a policy generator.

FIG. 20 is a block diagram illustrating the architecture of a policy generator. First, the PyangBind library generates a Python class hierarchy from the inputs of the NFI YANG data model. This allows low-level data instances from the data converter to be inserted into the NFI Python Class. To obtain the appropriate attributes, the low-level data is paired with attributes received from the data model mapper. The filled items may then be encoded into an XML or JSON form automatically by PyangBind. FIG. 21 is a diagram illustrating a low-level policy, and shows an XML example of a low-level policy generated by a converter.

In summary, the policy generator combines low-level data and low-level attributes in pairs to generate a low-level policy in an XML or JSON form for a target NSF.

Implementation Considerations

The implementation considerations in this specification include the following three: "data model auto-adaptation", "data conversion" and "policy provisioning".

Data Model Auto-Adaptation

The security controller acting as an intermediary entity must process data according to a data model of an interface connected thereto. However, the data model may be flexibly changed according to circumstances, and the security controller may be adjusted according to the change of the data model. Therefore, the security controller may be conveniently implemented so that the security policy converter can easily adapt to the change of the data model.

The converter constructs and uses the DFA to adapt to the consumer-facing interface data model. The DFA starts from the root node of the YANG tree and expands operations by changing the state according to an input. Based on the YANG data model, a container node is defined as an intermediate state and a leaf node is defined as an extractor node. Then, when the nodes are connected in the same way as the hierarchical structure of the data model, the security controller may automatically construct the DFA. Therefore, it is possible to conveniently build the DFA by investigating a link structure using a stack through a depth-first search, starting from the root node.

The policy generator uses PyangBind to construct the hierarchy of the NFI YANG data model into a Python class. This allows an XML or JSON form to be generated automatically even when the NFI YANG data model are updated. Thus, the security policy converter is able to automatically adapt to the NFI YANG data model.

Data Conversion

The security controller requires the ability to materialize abstract data in a higher-level security policy and forward the data to an NSF. The security controller may receive endpoint information as a keyword through the high-level security policy. In this case, if endpoint information corresponding to the keyword is mapped and a query is transmitted to the NSF database, information necessary for data conversion may be conveniently registered in the NSF database. When a policy tries to establish a policy through a keyword, the security controller searches for content corresponding to a keyword registered in the NSF database and converts the keyword into appropriate and specific data.

Policy Provisioning

The specification states that a policy provisioning function is necessary to enable an I2NSF user without expert security knowledge to generate a policy. Policy provisioning is determined by the capability of NSFs. The policy provisioning uses the information about the NSFs' capabilities for a security policy to find the optimal NSFs that can be selected to provide the security services. The tasks should make sure that the security policy can be implemented by the NSFs and the cost of NSFs that implement the security services should be as low as possible.

Features of Security Policy Translator Design

First, by showing the structure of the visualized converter, the security manager may be able to handle various policy changes. The translator may be displayed by visualizing the DFA so that the structure of the security policy converter can be easily understood by a manager.

Second, if the hierarchy of a data model is maintained, an I2NSF user may be able to freely generate a high-level policy. In the case of DFA, data extraction may be performed in the same way even if an input order is changed. The design of the security policy converter is more flexible than an existing method that operates by keeping tags' position and order exactly.

Third, the structure of the security policy translator may be updated even while the security policy converter is operating. Because the security policy translator is modularized, the translator may adapt to changes in NSF's capabilities while the I2NSF framework is running. The function of changing the structure of the translator may be provided through the Registration Interface (RI).

According to the embodiments of the present disclosure described above, when an I2NSF user transmits a high-level security policy for a security service, the security policy translator of the security controller converts the high-level security policy to a low-level security policy for (Network Security Functions). In particular, by specifying a relationship between a high-level security policy based on the consumer-facing interface YANG data model and a low-level security policy based on the NSF-facing interface YANG data model, it is possible to automatically set security issues regarding complex network security functions only through the specification of network security services and to easily operate a security service without professional prior knowledge in a wireless network environment.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like. When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

Embodiments of the present disclosure can be implemented as computer-readable codes on a computer-readable recording medium. The computer-readable recording medium includes all types of recording devices in which data readable by a computer system is stored. Examples of the computer-readable recording medium include a ROM, a RAM, a CD-ROM, a magnetic tape, a floppy disk, an optical data storage device, etc. Further, the computer-readable recording medium may be distributed to computer systems connected over a network, and computer-readable codes may be stored and executed in a distributed manner. Functional programs, codes, and code segments for implementing the embodiments can be easily construed by programmers skilled in the art to which the present disclosure pertains.

Hereinabove, the present disclosure has been described with reference to various embodiments. It can be understood by those skilled in the art to which the present disclosure pertains that various modification examples may be made by the configurations and methods described and illustrated herein without departing from the scope of the present disclosure. Therefore, embodiments disclosed herein should be considered in an illustrative aspect rather than a restrictive aspect. Further, the scope of the present disclosure is not limited by the above-described embodiments and should be defined only in accordance with the accompanying claims and their equivalents.

What is claimed is:

1. A method in which a security controller translates a security policy for Interface to Network Security Functions (I2NSF), the method comprising: extracting data from a higher-level policy received from an I2NSF user; converting the extracted data into a capability of a target network security function (NSF) of the security policy by referring to mapping information between elements of a high-level data model and elements of a low-level data model; and generating a lower-level policy to execute the capability of the NSF, wherein in the mapping information, the high-level data model and the low-level data model are respectively converted into tree graphs, a tree edit distance between respective elements of the converted tree graphs is calculated, and similar elements between the data models are stored as mapping candidates by using calculated minimum distances.

2. The method of claim 1, wherein in the extracting of the data, data is extracted from the higher-level policy through state transition using a Deterministic Finite Automaton (DFA).

3. The method of claim 1, wherein the converting into the capability of the target NSF comprises:
selecting a target NSF for providing a security service by using the extracted data; and
converting the extracted data into a capability of the selected target NSF.

4. The method of claim 3, wherein in the selecting of the target NSF, the extracted data is compared with information about capabilities of NSFs possessed by the security controller to search for a target NSF only with higher-level policy data.

5. The method of claim 1, wherein in the converting into the capability of the target NSF, high-level policy data is converted into low-level policy data compatible with the target NSF by referring to an NSF database comprising endpoint information and NSF capability information.

6. The method of claim 5, wherein
the endpoint information is received as a higher-level policy from an I2NSF user to apply a security policy,
the NSF capability information is received from a Developer's Management System (DMS) to indicate features supported by NSFs, and
the NSF database is constructed based on the received endpoint information and the NSF capability information.

7. The method of claim 1, wherein the tree editing distance is calculated using at least one metric of Levenshtein distance, cosine similarity, and sequence matching.

8. The method of claim 1, wherein in the generating of the lower-level policy, low-level data and low-level attributes are combined in pairs to generate a low-level policy in an Extensible Markup Language (XML) or JavaScript Object Notation (JSON) form for the target NSF.

9. The method of claim 1, wherein the security controller is connected to the I2NSF user through a Consumer-Facing Interface (CFI) to receive the higher-level policy, and transmits the lower-level policy through an NSF-Facing Interface (NFI) to the target NSF for executing a rule corresponding to the lower-level policy.

10. An apparatus for translating a security policy for Interface to Network Security Functions (I2NSF), the apparatus comprising: a non-transitory memory storing instructions; and a hardware-based controller configured to execute the instructions to: extract data from a higher-level policy received from an I2NSF user; convert the extracted data into a capability of a target Network Security Function (NSF) of a security policy by referring to mapping information between elements of a high-level data model and elements of a low-level data model; and generate a low-level policy to execute the capability of the NSF, wherein in the mapping information, the high-level data model and the low-level data model are respectively converted into tree graphs, a tree edit distance between respective elements of the converted tree graphs is calculated, and similar elements between the data models are stored as mapping candidates by using calculated minimum distances.

11. The apparatus of claim 10, wherein the controller is further configured to extract data through state transition from the higher-level policy using Deterministic Finite Automaton (DFA).

12. The apparatus of claim 10, wherein the controller is further configured to:
select a target NSF for providing a security service by using the extracted data; and
convert the extracted data into a capability of the selected target NSF.

13. The apparatus of claim 12,
wherein the controller is further configured to compare the extracted data with information on capabilities of NSFs possessed by the controller to search for a target NSF only with higher-level policy data.

14. The apparatus of claim 10, wherein the controller is further configured to convert high-level policy data into low-level policy data compatible with the target NSF by referring to an NSF database containing endpoint information and NSF capability information.

15. The apparatus of claim 14, wherein
the endpoint information is received as a higher-level policy from an I2NSF user to apply a security policy,
the NSF capability information is received from a Developer's Management System (DMS) to indicate features supported by NSFs, and
the NSF database is constructed based on the received endpoint information and the NSF capability information.

16. The apparatus of claim 10, wherein the tree editing distance is calculated using at least one metric of Levenshtein distance, cosine similarity, and sequence matching.

17. The apparatus of claim 10, wherein the controller is further configured to combine low-level data and low-level attributes in pairs to generate a low-level policy in an Extensible Markup Language (XML) or JavaScript Object Notation (JSON) form for the target NSF.

18. The apparatus of claim 10, wherein the controller is connected to the I2NSF user through a Consumer-Facing Interface (CFI) to receive the higher-level policy, and transmits the lower-level policy through an NSF-Facing Interface (NFI) to the target NSF for executing a rule corresponding to the lower-level policy.

* * * * *